United States Patent
Hayashi et al.

(10) Patent No.: US 7,436,759 B2
(45) Date of Patent: Oct. 14, 2008

(54) RECEPTION APPARATUS AND METHOD, AND CHANNEL RESPONSE MEASUREMENT APPARATUS FOR RECEIVING AN ORTHOGONAL FREQUENCY DIVISIONAL MULTIPLEXING SIGNAL

(75) Inventors: Takaya Hayashi, Nagaokakyo (JP); Kenichiro Hayashi, Kyotanabe (JP); Takehiro Kamada, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 711 days.

(21) Appl. No.: 10/514,818

(22) PCT Filed: May 16, 2003

(86) PCT No.: PCT/JP03/06165

§ 371 (c)(1),
(2), (4) Date: Nov. 17, 2004

(87) PCT Pub. No.: WO03/098853

PCT Pub. Date: Nov. 27, 2003

(65) Prior Publication Data
US 2005/0174929 A1    Aug. 11, 2005

(30) Foreign Application Priority Data
May 17, 2002    (JP)    ............................. 2002-143909

(51) Int. Cl.
*H04J 11/00*    (2006.01)
*H04J 1/00*    (2006.01)
*H04L 7/04*    (2006.01)

(52) U.S. Cl. .................... 370/208; 370/343; 375/362

(58) Field of Classification Search .................. None
See application file for complete search history.

(56) References Cited

U.S. PATENT DOCUMENTS

| | | | | |
|---|---|---|---|---|
| 6,654,429 B1 * | 11/2003 | Li | ............................... | 375/316 |
| 7,023,938 B1 * | 4/2006 | Kapoor et al. | .............. | 375/350 |
| 7,139,320 B1 * | 11/2006 | Singh et al. | ................. | 375/260 |
| 7,209,433 B2 * | 4/2007 | Scarpa | ....................... | 370/206 |

FOREIGN PATENT DOCUMENTS

| | | |
|---|---|---|
| JP | 10-126331 | 5/1998 |
| JP | 11-163771 | 6/1999 |
| JP | 2000-165346 | 6/2000 |
| JP | 2000-286817 | 10/2000 |
| JP | 2002-208905 | 7/2002 |
| JP | 2002-261721 | 9/2002 |

* cited by examiner

*Primary Examiner*—Firmin Backer
*Assistant Examiner*—Nittaya Juntima
(74) *Attorney, Agent, or Firm*—McDermott Will & Emery LLP

(57) ABSTRACT

A reception apparatus for receiving an OFDM signal having a plurality of pilot carriers that transmit predetermined pilot signals at predetermined symbols. The reception apparatus transforms the received OFDM signal to a frequency-domain OFDM signal, determines channel responses corresponding to the transmitted pilot signals for each of the pilot carriers among a plurality of carriers constituting the frequency-domain OFDM signal, determines, based on channel responses corresponding to first, second and third pilot signals transmitted sequentially in a same carrier, a channel response at a symbol between the second pilot signal and the third pilot signal, compensates a waveform distortion in the frequency-domain OFDM signal according to the channel response at the symbol between the second pilot signal and the third pilot signal and outputs the results.

31 Claims, 24 Drawing Sheets

FIG. 8
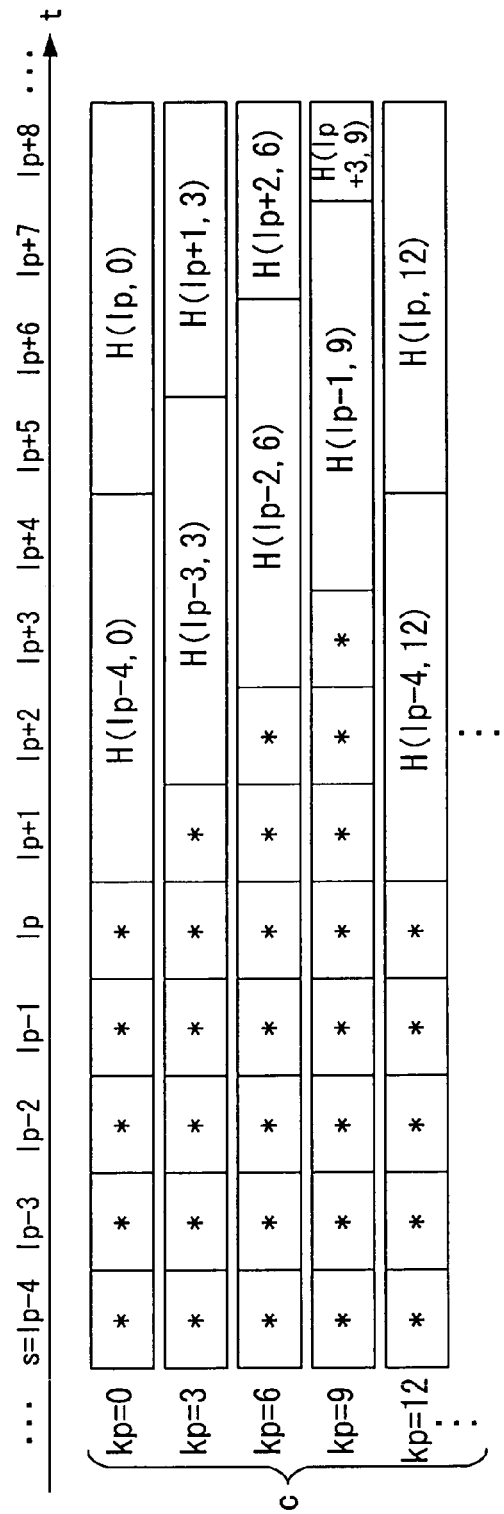
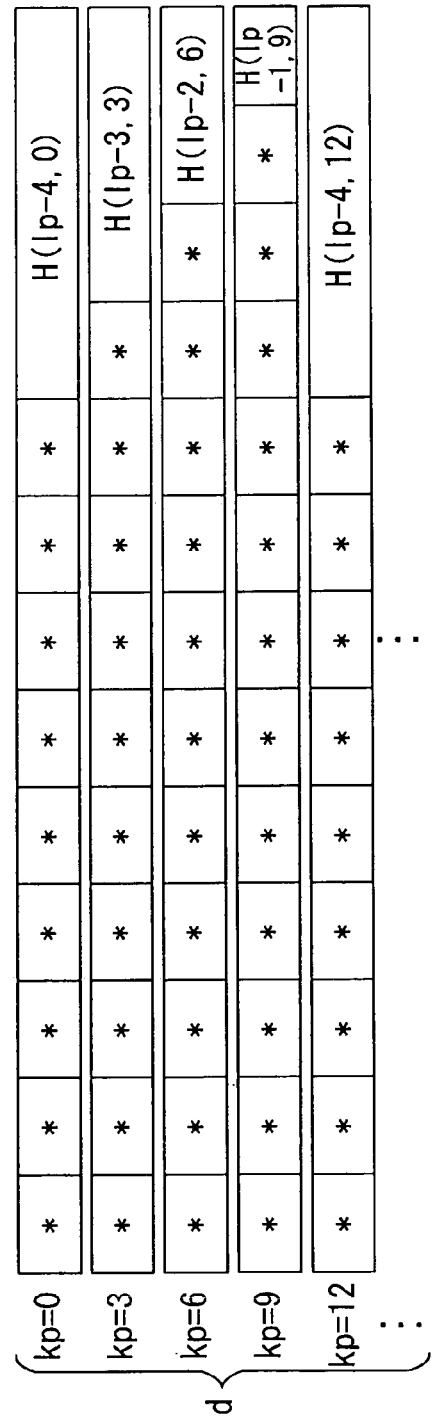

FIG. 9

| | s=Ip-4 | Ip-3 | Ip-2 | Ip-1 | Ip | Ip+1 | Ip+2 | Ip+3 | Ip+4 | Ip+5 | Ip+6 | Ip+7 | Ip+8 ... → t |
|---|---|---|---|---|---|---|---|---|---|---|---|---|---|
| kp=0 | -c/4 +5·b/4 | -3·d/4 +7·c/4 | -d/2 +3·c/2 | -c/4 +5·b/4 | b | -c/4 +5·b/4 | -d/2 +3·c/2 +7·c/4 | b | -c/4 +5·b/4 | -d/2 +3·c/2 +7·c/4 | -3·d/4 +7·c/4 | b | -c/4 +5·b/4 |
| kp=3 | b | -c/4 +5·b/4 | -c/4 +5·b/4 | b | -3·d/4 +7·c/4 | -d/2 +3·c/2 | -d/2 +3·c/2 +7·c/4 | -3·d/4 +7·c/4 | b | -c/4 +5·b/4 | -d/2 +3·c/2 +7·c/4 | b | b +5·b/4 |
| kp=6 | -3·d/4 +7·c/4 | b | -3·d/4 +7·c/4 | -d/2 +3·c/2 | b | -3·d/4 +7·c/4 | -d/2 +3·c/2 +7·c/4 | -d/2 +3·c/2 +7·c/4 | -3·d/4 +7·c/4 | b | -c/4 +5·b/4 | -3·d/4 +7·c/4 | -3·d/4 +7·c/4 |
| kp=9 | -d/2 +3·c/2 | -3·d/4 +7·c/4 | -c/4 +5·b/4 | b | -c/4 +5·b/4 | -d/2 +3·c/2 +7·c/4 | -3·d/4 +7·c/4 | -d/2 +3·c/2 +7·c/4 | -3·d/4 +7·c/4 | b | -c/4 +5·b/4 | -d/2 +3·c/2 +7·c/4 | -d/2 +3·c/2 |
| kp=12 ... | -c/4 +5·b/4 | -c/4 +5·b/4 | -3·d/4 +7·c/4 | -d/2 +3·c/2 +7·c/4 | -3·d/4 +7·c/4 | b | -c/4 +5·b/4 | -3·d/4 +7·c/4 | -d/2 +3·c/2 +7·c/4 | -3·d/4 +7·c/4 | -3·d/4 +7·c/4 | -c/4 +5·b/4 | -c/4 +5·b/4 | fa
(LINEAR EXTRAPOLATION OPERATION PATTERN)

| | | | | | | | | | | | | |
|---|---|---|---|---|---|---|---|---|---|---|---|---|
| kp=0 ... | * | * | * | * | H(Ip-4,0) | * | * | * | H(Ip,0) | -H(Ip-4,0) +5·H(Ip,0)/4 | -H(Ip-4,0)/4+3·H(Ip,0)/2 | -3·H(Ip-4,0)/4+7·H(Ip,0)/4 | H(Ip+4,0) | -H(Ip,0)/4 +5·H(Ip+4,0)/4 |

Ha
(LINEAR EXTRAPOLATION OPERATION RESULTS)

US 7,436,759 B2

RECEPTION APPARATUS AND METHOD, AND CHANNEL RESPONSE MEASUREMENT APPARATUS FOR RECEIVING AN ORTHOGONAL FREQUENCY DIVISIONAL MULTIPLEXING SIGNAL

RELATED APPLICATION

This application is a national phase application of PCT/JP03/06165, filed May 16, 2003, which claims priority to a Japanese Patent Application Number 2002-143909, filed on May 17, 2002. The entire content of these application are herewith incorporated by reference.

TECHNICAL FIELD

The present invention relates to a technology of receiving an orthogonal frequency division multiplexing (OFDM) signal.

BACKGROUND ART

With the recent rapid progress of the digital transmission technology, digital broadcasting is about to enter the stage of full-scale commercialization even in terrestrial broadcasting, in succession to satellite broadcasting and cable TV broadcasting. In particular, OFDM has already been put into practical use as the terrestrial digital TV broadcasting system in Europe. In Japan, also, it has already been decided to adopt OFDM as the terrestrial digital TV broadcasting system and the terrestrial digital audio broadcasting system. Moreover, some wireless LANs (local area networks) and the like have adopted OFDM for their transmission systems.

In OFDM transmission systems, data is allocated to a plurality of carriers orthogonal to each other to perform modulation/demodulation. Inverse fast Fourier transform (IFFT) is performed on the transmitter side, while fast Fourier transform (FFT) is performed on the receiver side. An arbitrary modulation scheme may be used for each of the carriers. Synchronous modulation schemes such as quaternary phase shift keying (QPSK) and quadrature amplitude modulation (QAM) may also be selected.

For demodulation of a synchronous-modulated signal, pilot signals are inserted in predetermined carriers on the transmitter side in some OFDM-adopting transmission systems. Pilot symbols, called scattered pilots (SP), are inserted in the OFDM transmission systems adopted for the terrestrial digital TV broadcasting in Europe and Japan.

The pilot signal is a signal of which the amplitude and phase are known on the receiver side, and is inserted at a predetermined position on the time axis in a predetermined carrier of a transmitted signal. The position of the insertion is also known on the receiver side.

On the receiver side, channel responses are determined based on the pilot signals, to equalize and demodulate the received signal. Specifically, channel responses corresponding to the received pilot signals are determined, and interpolation is made using the determined channel responses along the time axis and the frequency axis, to thereby estimate channel responses at the timings of symbols between the pilot signals. Based on the estimation results, the received signal is equalized.

In reception of an OFDM signal with mobile units and the like, a phenomenon called fading occurs in which the amplitude and phase of the received signal change with time. In this event of the fading interfering with the received signal, the waveform of the received signal is distorted. To compensate the influence of this distortion appropriately, the interpolation made using the channel responses for the pilot signals along the time axis plays an important role.

An interpolation method using channel responses for pilot signals employed in a conventional reception apparatus receiving an OFDM signal will be described. FIG. 20 is a block diagram showing a configuration of a conventional reception apparatus. The reception apparatus of FIG. 20 includes a tuner section 11, an A/D conversion section 12, a quadrature demodulation section 13, a FFT section 14, a distortion compensation section 15, an error correction section 16, a pilot signal generation section 21, a channel response calculation section 22, a frequency axis interpolation section 23 and a time axis interpolation section 930. The time axis interpolation section 930 includes a memory 931 and a selector 934.

FIG. 2 is a view illustrating a specific example of arrangement of symbols for transmitting pilot signals in an OFDM signal. As shown in FIG. 2, pilot signals P1 are transmitted every four symbols, so that channel responses for the pilot signals P1 are obtained every four symbols. This indicates that channel responses for three data signals D1 between the adjacent pilot signals must be determined from the channel responses for the pilot signals P1.

The time axis interpolation section 930 estimates channel responses for the data signals between the pilot signals from the channel responses for the pilot signals determined by the channel response calculation section 22, by performing zero-order interpolation (also called "hold") using the channel responses for the pilot signals, for pilot signal-inserted carriers.

FIG. 21 is a view illustrating an example of channel responses obtained by zero-order interpolation. The channel responses are represented as scalars in FIG. 21 for convenience of description although they should strictly be represented by complex vectors. The zero-order interpolation is a method in which channel responses for signals between two pilot signals continuous on the time axis are estimated by using the channel response for the preceding pilot signal out of the channel responses for these pilot signals as a representative.

The channel response at a symbol of a symbol index s for a carrier of a carrier index $k_p$ is herein represented by $H(s, k_p)$. Consider a carrier of a carrier index $k_p$ having pilot signals inserted at positions of symbol indexes $s=l_p-4, l_p, l_p+4, \ldots$ ($l_p$ is an integer) in a cycle of four symbols. Assume that zero-order interpolation is performed for this carrier between the symbol indexes $s=l_p-4$ and $s=l_p$ and between the symbol indexes $s=l_p$ and $s=l_p+4$. The channel responses for the pilot signals of this carrier at the symbol indexes $s=l_p-4$ and $l_p$ are $H(l_p-4, k_p)$ and $H(l_p, k_p)$, respectively. Thus, channel responses $H(l_p-3, k_p)$, $H(l_p-2, k_p)$ and $H(l_p-1, k_p)$ for data signals between the symbol indexes $s=l_p-4$ and $s=l_p$ obtained by zero-order interpolation are as follows.

$H(l_p-3, k_p)=H(l_p-4, k_p)$ $H(l_p-2, k_p)=H(l_p-4, k_p)$ $H(l_p-1, k_p)=H(l_p-4, k_p)$

Likewise, channel responses $H(l_p+1, k_p)$, $H(l_p+2, k_p)$ and $H(l_p+3, k_p)$ for data signals between the symbol indexes $s=l_p$ and $s=l_p+4$ obtained by zero-order interpolation are as follows.

$H(l_p+1, k_p)=H(l_p, k_p)$ $H(l_p+2, k_p)=H(l_p, k_p)$ $H(l_p+3, k_p)=H(l_p, k_p)$

Note that although the above description is for the carrier having pilot signals inserted at positions of symbol indexes $s=l_p-4, l_p, l_p+4, \ldots$, the above operation pattern can also be used for determining channel responses for data signals for carriers having pilot signals inserted at positions of other symbol indexes and for determining channel responses for data signals between other symbol indexes.

The configuration and operation of the time axis interpolation section 930 that performs zero-order interpolation as described above over the entire pilot signal-inserted carriers will be described. The channel responses for the pilot signals output from the channel response calculation section 22 are input into the memory 931 and the selector 934. The memory 931 holds the input channel responses for the pilot signals. In the example of arrangement of pilot signals shown in FIG. 2, in which one every three carriers has pilot signals inserted therein, the memory 931 may only have a capacity of holding channel responses for carriers one-third the total number of carriers.

The memory 931 holds the input channel responses and also outputs the held channel responses to the selector 934, updating the held/output values upon receipt of new channel responses. The selector 934 selects the signal output from the memory 931 at the time corresponding to data signals between the adjacent pilot signals, and selects a channel response for a new pilot signal from the channel response calculation section 22 when the channel response for a pilot signal is updated, for each pilot signal-inserted carrier.

FIG. 7 shows a timing chart of values a and b input into the selector 934. The selector 934 selects the output of the channel response calculation section 22 (value a) when a channel response for a pilot signal is input, and selects the output of the memory 931 (value b) when no channel response for a pilot signal is input, for each of the carriers of indexes $k_p=0, 3, 6, \ldots$, and outputs the selected value. By operating in this way, the time axis interpolation section 930 determines a signal in which zero-order interpolation has been performed for the pilot signal-inserted carriers, and outputs the results to the frequency axis interpolation section 23.

Besides the method using zero-order interpolation, there are also known methods for interpolating/estimating channel responses along the time axis using first-order interpolation (linear interpolation). Time-axis interpolation using linear interpolation will be described.

FIG. 22 is a view illustrating an example of channel responses determined by linear interpolation. The channel responses are represented as scalars in FIG. 22 for convenience of description although they should strictly be represented by complex vectors. The linear interpolation is a method in which values obtained by interior-dividing the line segment connecting the channel responses for two pilot signals continuous on the time axis are estimated as channel responses between the two pilot signals.

The linear interpolation will be described, using the OFDM signal used in the description of the zero-order interpolation. For a carrier of a carrier index $k_p$, the channel responses $H(l_p-3, k_p)$, $H(l_p-2, k_p)$ and $H(l_p-1, k_p)$ for data signals between the symbol indexes $s=l_p-4$ and $s=l_p$ obtained by linear interpolation are as follows.

$$H(l_p-3, k_p)=(3/4)\cdot H(l_p-4, k_p)+(1/4)\cdot H(l_p, k_p)$$

$$H(l_p-2, k_p)=(1/2)\cdot H(l_p-4, k_p)+(1/2)\cdot H(l_p, k_p)$$

$$H(l_p-1, k_p)=(1/4)\cdot H(l_p-4, k_p)+(3/4)\cdot H(l_p, k_p)$$

Likewise, the channel responses $H(l_p+1, k_p)$, $H(l_p+2, k_p)$ and $H(l_p+3, k_p)$ for data signals between the symbol indexes $s=l_p$ and $s=l_p+4$ are as follows.

$$H(l_p+1, k_p)=(3/4)\cdot H(l_p, k_p)+(1/4)\cdot H(l_p+4, k_p)$$

$$H(l_p+2, k_p)=(1/2)\cdot H(l_p, k_p)+(1/2)\cdot H(l_p+4, k_p)$$

$$H(l_p+3, k_p)=(1/4)\cdot H(l_p, k_p)+(3/4)\cdot H(l_p+4, k_p)$$

Note that although the above description is for the carrier having pilot signals inserted at positions of symbol indexes $s=l_p-4, l_p, l_p+4, \ldots$, the above operation pattern can also be used for carriers having pilot signals inserted at positions of other symbol indexes and for obtaining channel responses for data signals between other symbol indexes.

FIG. 23 is a block diagram showing another configuration of the time axis interpolation section of the conventional reception apparatus. The configuration and operation of a time axis interpolation section 940 that performs linear interpolation as described above over the entire pilot signal-inserted carriers will be described. The time axis interpolation section 940 includes memories 941a and 941b, a controller 942 and an operator 944.

The controller 942 controls the operations of the memories 941a and 941b and the operator 944. The channel responses for pilot signals output from the channel response calculation section 22 are input into the memory 941a and the operator 944. The memories 941a and 941b hold the input channel responses for pilot signals. In the example of arrangement of pilot signals shown in FIG. 2, in which one every three carriers has pilot signals inserted therein, each of the memories 941a and 941b may only have a capacity of holding one value of channel response each for carriers one-third the total number of carriers.

The memory 941a holds the input channel responses and also outputs the held channel responses to the memory 941b and the operator 944. The memories 941a and 941b update the held/output values upon receipt of new channel responses. The operator 944 selects the signals output from the memories 941a and 941b at the time corresponding to data signals between the adjacent pilot signals, and selects a channel response for a new pilot signal from the channel response calculation section 22 when the channel response for a pilot signal is updated, for each pilot signal-inserted carrier.

The operator 944 selects the output signals of the channel response calculation section 22 and the memories 941a and 941b as appropriate, multiplies each of the selected signals by a coefficient and calculates the sum of the multiplication results, based on an operation pattern determined for each symbol, and outputs the resultant interpolated channel response.

FIGS. 7 and 8 are timing charts of values a, b and c input into the operator 944. The values a, b and c are respectively output from the channel response calculation section 22, and the memories 941a and 941b. The value b represents the channel response for a pilot signal immediately preceding the pilot signal related to the value a, and the value c represents the channel response for a pilot signal immediately preceding the pilot signal related to the value b.

FIG. 10 is a timing chart showing an operation pattern used in the operator 944. The operator 944 executes operation according an operation pattern fb in FIG. 10 for the respective carriers of indexes $k_p=0, 3, 6, \ldots$, and outputs the operation results Hb. From FIGS. 7, 8 and 10, it is found that the linear-interpolated channel responses are obtained with delay of three symbols. By operating as described above, the time axis interpolation section 940 determines the linear-interpolated channel responses for the pilot signal-inserted carriers, and outputs the results to the frequency axis interpolation section 23.

FIG. 24 is a block diagram showing a configuration of a time axis interpolation section that performs time axis interpolation using a FIR filter. Besides the methods using zero-order interpolation and linear interpolation as described above, there are also known methods for interpolating/estimating channel responses along the time axis using a FIR filter. Time axis interpolation using a FIR filter will be described.

A time axis interpolation section 950 of FIG. 24 includes a 0 insertion portion 956, memories 951, 952, . . . , 953 and an operator 960. The operator 960 includes N0 (an integer equal to or more than 2) multipliers 961, 962, . . . , 964 and an adder 966, constituting a FIR filter having N0 taps.

The 0 insertion portion 956 receives channel responses for pilot signals output from the channel response calculation section 22. The 0 insertion portion 956 inserts "0" as channel responses for pilot signal-inserted carriers to correspond to data signals at three symbols between the adjacent two pilot signals. For example, when receiving $H(l_p, k_p)$ and $H(l_p+4, k_p)$ as channel responses for two pilot signals, the 0 insertion portion 956 fills the time corresponding to three symbols therebetween with "0" to obtain $H(l_p, k_p), 0, 0, 0, H(l_p+4, k_p)$. The 0 insertion portion 956 outputs the thus-processed results to the memory 951 and the multiplier 961.

The memories 951, . . . , 953 are connected in series as shown in FIG. 24. Each of the memories 951, . . . , 953 holds channel responses obtained for carriers one-third the total number of carriers. The memory 951 holds the input channel responses and also outputs the held channel responses to the memory 952 and the multiplier 962, updating the held/output values on receipt of new channel responses, for the pilot signal-inserted carriers. Likewise, the other memories hold the input channel responses and also output the held channel responses to their downstream memory and corresponding multiplier.

The operator 960 executes linear operation for signals output from the channel response calculation section 22 and the memories 951 , . . . , 953. The multipliers 961, 962, . . . , 964 multiply the signals output from the channel response calculation section 22 and the memories 951, . . . , 953 by tap coefficients $A_0, A_1, \ldots, A_{N0-1}$, respectively, and the adder 966 calculates the sum of the multiplication results and outputs the results.

As a result, $H(l_p+1, k_p)$, $H(l_p+2, k_p)$ and $H(l_p+3, k_p)$ are obtained as interpolated channel responses for the timings of three symbols between the two channel responses $H(l_p, k_p)$ and $H(l_p+4, k_p)$ for the two pilot signals, for the pilot signal-inserted carriers.

By the processing described above, the time axis interpolation section 950 determines channel responses obtained by the FIR filter-using interpolation for pilot signal-inserted carriers, and outputs the results to the frequency axis interpolation section 23.

The technique of determining channel responses of an OFDM signal by linear interpolation, as well as the FIR filter-using interpolation method, as described above are disclosed in Japanese Laid-Open Patent Publication No. 2000-286817, for example.

Problems to be Solved

In reception of an OFDM signal with mobile units and the like, the channel responses change vigorously with time due to the influence of fading. In particular, in a reception environment where the channel responses vary at high speed, the conventional time axis interpolation using zero-order interpolation or linear interpolation will cause a large error between the estimated channel responses and the actual channel responses. With such an error, it fails to appropriately remove the influence of the channel on the received signal, and this results in degrading the demodulation performance.

FIGS. 21 and 22 show errors in estimation of channel responses in zero-order interpolation and linear interpolation, respectively, occurring when the channel responses vary at high speed. In the linear interpolation, the error can be made smaller compared with that in the zero-order interpolation, but yet an error of some degree occurs in estimating channel responses varying at high speed.

In the FIR filter-using time axis interpolation, the error in estimation of channel responses varying at high speed can be made smaller than in the zero-order interpolation and the linear interpolation. However, as the number of taps of the filter increases, the memory capacity must be larger, and this increases the circuit size. In addition, the FIR filter-using time axis interpolation causes a delay corresponding to the number of taps of the filter. For a filter having N0 taps (N0 is an odd number), a delay corresponding to [N0/2] symbols (where [X] represents an integer closest to X and equal to or less than X) arises.

When the reception apparatus of FIG. 20 includes the time axis interpolation section 950, the distortion compensation section 15 executes complex division of the output signal of the FFT section 14 by the channel responses for the entire carriers obtained by the time axis interpolation section 950. If a delay of [N0/2] symbols arises in the channel responses obtained by the FIR filter-using time axis interpolation section 950, it is necessary to delay the signal by inserting a delay memory of the [N0/2] symbols between the FFT section 14 and the distortion compensation section 15 to secure synchronization, so as to ensure that the distortion compensation section 15 executes complex division of the signal delayed by [N0/2] symbols by the channel responses obtained by the frequency axis interpolation section 23. Therefore, as the number of taps increase, the capacity of the delay memory must be larger, and this increases the circuit size.

DISCLOSURE OF THE INVENTION

An object of the present invention is providing a reception apparatus and a reception method capable of accurately estimating channel responses varying at high speed, based on pilot signals in a received signal, without the necessity of increasing the circuit size so greatly.

The reception apparatus of the present invention is a reception apparatus for receiving an orthogonal frequency division multiplexing (OFDM) signal having a plurality of pilot carriers, the pilot carriers being carriers transmitting predetermined pilot signals at predetermined symbols, wherein the reception apparatus transforms the received OFDM signal to a frequency-domain OFDM signal, determines channel responses corresponding to the transmitted pilot signals for each of the pilot carriers among a plurality of carriers constituting the frequency-domain OFDM signal, determines, based on channel responses corresponding to first, second and third pilot signals transmitted sequentially in a same carrier, a channel response at a symbol between the second pilot signal and the third pilot signal, and compensates a waveform distortion in the frequency-domain OFDM signal according to the channel response at the symbol between the second pilot signal and the third pilot signal and outputs the results.

According to the invention described above, a channel response at a symbol free from transmitting a pilot signal is estimated based on channel responses corresponding to three pilot signals. The resultant estimation is more accurate than the case of estimation by only linear interpolation based on channel responses corresponding to two pilot signals. Therefore, more precise waveform distortion compensation is attained.

Alternatively, the reception apparatus of the present invention is a reception apparatus for receiving an OFDM signal having a plurality of pilot carriers, the pilot carriers being carriers transmitting predetermined pilot signals at predetermined symbols, the reception apparatus including: a Fourier transform section for transforming the received OFDM signal to a frequency-domain OFDM signal; a pilot signal generation section for generating the predetermined pilot signals as frequency-domain signals and outputting the results; a channel response calculation section for determining channel responses corresponding to the transmitted pilot signals based on the frequency-domain OFDM signal and the output of the pilot signal generation section for each of the pilot carriers among a plurality of carriers constituting the frequency-domain OFDM signal and outputting the results; a time axis interpolation section for determining, based on channel responses corresponding to first, second and third pilot signals transmitted sequentially in a same carrier, a channel response at a symbol between the second pilot signal and the third pilot signal and outputting the results; and a distortion compensation section for compensating a waveform distortion in the frequency-domain OFDM signal according to the channel response output from the time axis interpolation section.

According to the invention described above, the time axis interpolation section estimates a channel response at a symbol free from transmitting a pilot signal based on channel responses corresponding to three pilot signals. The resultant estimation is more accurate than the case of estimation by only linear interpolation based on channel responses corresponding to two pilot signals. Therefore, more precise waveform distortion compensation is attained in the distortion compensation section.

Alternatively, the reception apparatus of the present invention is a reception apparatus for receiving an OFDM signal having a plurality of pilot carriers, the pilot carriers being carriers transmitting predetermined pilot signals at predetermined symbols, the reception apparatus including: a tuner section for tuning the OFDM signal from a received signal and outputting the resultant signal; a quadrature demodulation section for transforming the signal output from the tuner section to a baseband OFDM signal and outputting the resultant signal; a Fourier transform section for transforming the signal output from the quadrature demodulation section to a frequency-domain OFDM signal and outputting the resultant signal; a pilot signal generation section for generating the predetermined pilot signals as frequency-domain signals and outputting the results; a channel response calculation section for determining channel responses corresponding to the transmitted pilot signals based on the frequency-domain OFDM signal and the output of the pilot signal generation section for each of the pilot carriers among a plurality of carriers constituting the frequency-domain OFDM signal; a time axis interpolation section for determining, based on channel responses corresponding to first, second and third pilot signals transmitted sequentially in a same carrier, a channel response at a symbol between the second pilot signal and the third pilot signal and outputting the results; a distortion compensation section for compensating a waveform distortion in the frequency-domain OFDM signal according to the channel response output from the time axis interpolation section and outputting the resultant signal; an error correction section for performing error correction for the waveform distortion-compensated signal from the distortion compensation section; and a source decoding section for decoding the error-corrected signal from the error correction section for each information source and outputting the resultant signal.

According to the invention described above, a channel response at a symbol free from transmitting a pilot signal is estimated accurately based on channel responses corresponding to three pilot signals. Therefore, more precise waveform distortion compensation can be performed for a signal received via an antenna and the like, to obtain a video signal, an audio signal and the like before being subjected to source coding.

The channel response measurement apparatus of the present invention is an apparatus for receiving an OFDM signal having a plurality of pilot carriers, the pilot carriers being carriers transmitting predetermined pilot signals at predetermined symbols, and measuring a channel response, the apparatus including: a Fourier transform section for transforming the received OFDM signal to a frequency-domain OFDM signal and outputting the resultant signal; a pilot signal generation section for generating the predetermined pilot signals as frequency-domain signals and outputting the results; a channel response calculation section for determining channel responses corresponding to the transmitted pilot signals based on the frequency-domain OFDM signal and the output of the pilot signal generation section for each of the pilot carriers among a plurality of carriers constituting the frequency-domain OFDM signal; and a time axis interpolation section for determining, based on channel responses corresponding to first, second and third pilot signals transmitted sequentially in a same carrier, a channel response at a symbol between the second pilot signal and the third pilot signal and outputting the results.

According to the invention described above, a channel response at a symbol free from transmitting a pilot signal is estimated accurately based on the channel responses corresponding to three pilot signals. This enables accurate measurement of a channel response.

Alternatively, the reception apparatus of the present invention is a reception apparatus for receiving an OFDM signal having a plurality of pilot carriers, the pilot carriers being carriers transmitting predetermined pilot signals at predetermined symbols, the reception apparatus including: a Fourier transform section for transforming the received OFDM signal to a frequency-domain OFDM signal and outputting the resultant signal; a pilot signal extraction section for extracting the transmitted pilot signals for each of the pilot carriers among a plurality of carriers constituting the frequency-domain OFDM signal and outputting the results; a time axis interpolation section for determining, based on first, second and third pilot signals transmitted sequentially in a same carrier, an interpolated signal at a symbol between the second pilot signal and the third pilot signal and outputting the results; a pilot signal generation section for generating the predetermined pilot signals as frequency-domain signals and outputting the results; a channel response calculation section for determining a channel response based on the interpolated signal and the output of the pilot signal generation section; and a distortion compensation section for compensating a waveform distortion in the frequency-domain OFDM signal according to the channel response.

According to the invention described above, an interpolated signal is determined based on three pilot signals, and a channel response at a symbol free from transmitting a pilot signal is estimated from the interpolated signal. The resultant estimation is more accurate than the case of determination of an interpolated signal by only linear interpolation based on two pilot signals. Therefore, more precise waveform distortion compensation is attained.

Alternatively, the channel response measurement apparatus of the present invention is an apparatus for receiving an OFDM signal having a plurality of pilot carriers, the pilot carriers being carriers transmitting predetermined pilot signals at predetermined symbols, and measuring a channel response, the apparatus including: a Fourier transform section for transforming the received OFDM signal to a frequency-domain OFDM signal and outputting the resultant signal; a pilot signal extraction section for extracting the transmitted pilot signals for each of the pilot carriers among a plurality of carriers constituting the frequency-domain OFDM signal and outputting the results; a time axis interpolation section for determining, based on first, second and third pilot signals transmitted sequentially in a same carrier, an interpolated signal at a symbol between the second pilot signal and the third pilot signal and outputting the results; a pilot signal generation section for generating the predetermined pilot signals as frequency-domain signals and outputting the results; and a channel response calculation section for determining a channel response based on the interpolated signal and the output of the pilot signal generation section.

According to the invention described above, an interpolated signal is determined based on three pilot signals, and a channel response at a symbol free from transmitting a pilot signal is estimated from the interpolated signal. This enables accurate measurement of a channel response.

Effect of the Invention

According to the present invention, channel responses varying at high speed can be estimated accurately without the necessity of increasing the circuit size so greatly. This enables appropriate equalization of a received signal, and thus greatly improves the demodulation performance of the OFDM signal and the like even in the reception environment in which fading occurs vigorously, such as that surrounding mobile units.

BRIEF DESCRIPTION OF THE DRAWINGS

FIG. 8 is a timing chart showing other values representing channel responses that may be output from the memory in FIG. 1.

FIG. 9 is a timing chart for demonstrating extrapolation operation executed by an operator in FIG. 1.

BEST MODE FOR CARRYING OUT THE INVENTION

Hereinafter, embodiments of the present invention will be described with reference to the relevant drawings. As used herein, the OFDM signal refers to an OFDM signal having carriers for transmitting pilot signals (hereinafter, such carriers are also called pilot carriers), and may be any OFDM signal used in terrestrial digital TV broadcasting, terrestrial digital audio broadcasting, wireless LAN and the like.

EMBODIMENT 1

In Embodiment 1, a reception apparatus will be described, which determines channel responses corresponding to first, second and third pilot signals sequentially transmitted in each of pilot carriers among carriers constituting a received OFDM signal, and estimates channel responses at symbols between the second and third pilot signals of the carrier based on the determined channel responses.

Figure 1:
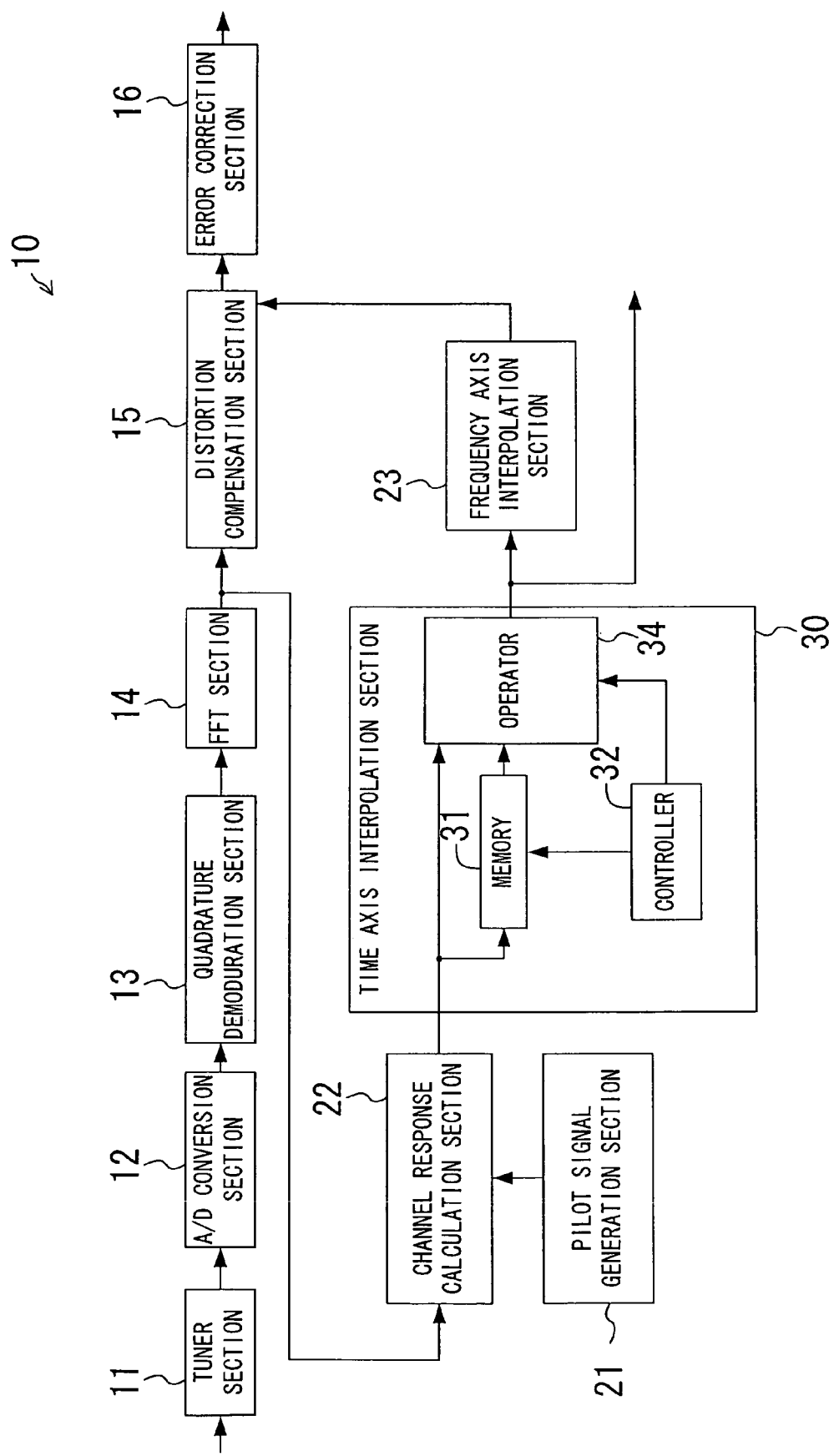
FIG. 1 is a block diagram showing a configuration of a reception apparatus of Embodiment 1 of the present invention.

FIG. 1 is a block diagram showing a configuration of a reception apparatus of Embodiment 1 of the present invention. The reception apparatus of FIG. 1 includes a tuner section 11, an A/D conversion section 12, a quadrature demodulation section 13, a FFT section 14 as the Fourier transform section, a distortion compensation section 15, an error correction section 16, a pilot signal generation section 21, a channel response calculation section 22, a frequency axis interpolation section 23 and a time axis interpolation section 30. The time axis interpolation section 30 includes a memory 31, a controller 32 and an operator 34.

Referring to FIG. 1, the tuner section 11 receives a signal via a receiving antenna or a cable. The tuner section 11 tunes the received signal to an OFDM signal and outputs the resultant signal to the A/D conversion section 12. The A/D conversion section 12 performs A/D conversion for the received OFDM signal to obtain a digital signal, and outputs the resultant signal to the quadrature demodulation section 13. The quadrature demodulation section 13 performs quadrature demodulation for the received signal to obtain a baseband OFDM signal, and outputs the resultant signal to the FFT section 14. The FFT section 14 performs fast Fourier transform for the received signal to transform the baseband OFDM signal in the time domain to an OFDM signal in the frequency domain, and outputs the resultant signal to the distortion compensation section 15 and the channel response calculation section 22.

The output of the FFT section 14 is a signal indicating the phase and amplitude of each of a plurality of carriers included in the OFDM signal. Specifically, the signal is handled in the form of a complex signal having an I axis component and a Q axis component independently. Predetermined carriers among the plurality of carriers (for example, one every three carriers) have pilot signals inserted at predetermined timings (for example, every four symbols).

Figure 2:
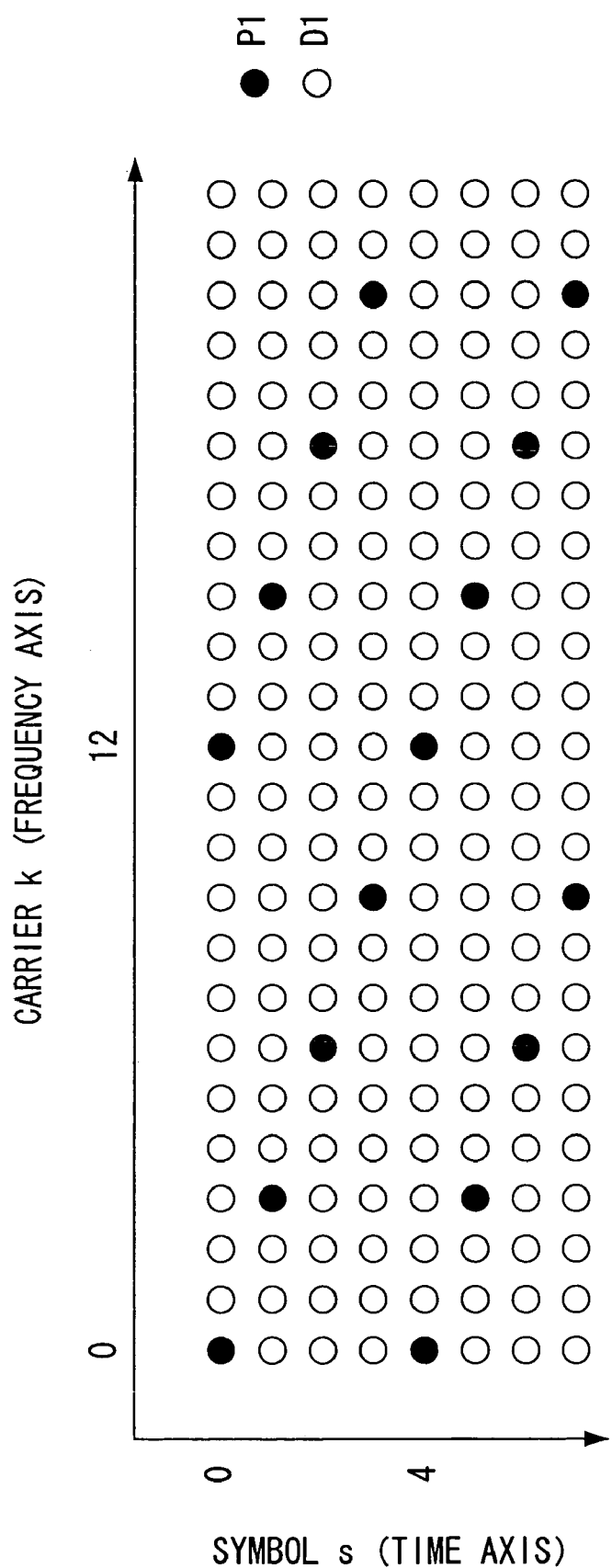
FIG. 2 is a view illustrating a specific example of arrangement of symbols for transmitting pilot signals in an OFDM signal received by the reception apparatus of FIG. 1.

FIG. 2 is a view illustrating a specific example of arrangement of symbols for transmitting pilot signals in the OFDM signal received by the reception apparatus of FIG. 1. FIG. 2 shows the positions of symbols for each of the plurality of carriers included in the OFDM signal. Each symbol transmits either a data signal D1 or a pilot signal P1. Assume that the OFDM signal has a total of K carriers (K is an integer equal to or more than 2).

In the following description, the index in the carrier direction (along the frequency axis) is called a carrier index k, and the index in the symbol direction (along the time axis) is called a symbol index s (k is an integer satisfying $0 \leq k \leq K-1$ and s is an integer), and assume that pilot signals are inserted in a carrier located at the position of a carrier index k=0 at a symbol index s=0. Assume also that carriers of carrier indexes k=0, 3, 6, . . . are pilot signal-inserted carriers, and that the carrier of a carrier index k=0 transmits pilot signals at symbols of symbol indexes s=0, 4, 8, . . . , and the carrier of a carrier index k=3 transmits pilot signals at symbols of symbol indexes s=1, 5, 9, . . . .

Likewise, one pilot signal-inserted carrier exists every three carriers, and pilot signals are inserted in such a carrier cyclically in a cycle of four symbols. As a result, symbol arrangement as shown in FIG. 2 is provided, in which the same pattern is repeated in a cycle of 12 carriers in the carrier direction and four symbols in the symbol direction.

The pilot signal generation section 21 generates pilot signals having a known amplitude and phase as frequency-domain signals at the same timing as that of the received pilot signals inserted in the output of the FFT section 14, and outputs the results to the channel response calculation section 22. The channel response calculation section 22 estimates channel responses for the transmitted pilot signals by executing division or the like of the inserted pilot signals by the known pilot signals generated by the pilot signal generation section 21, for each of the pilot carriers constituting the frequency-domain OFDM signal output from the FFT section 14, and outputs the results to the time axis interpolation section 30.

Figure 3:
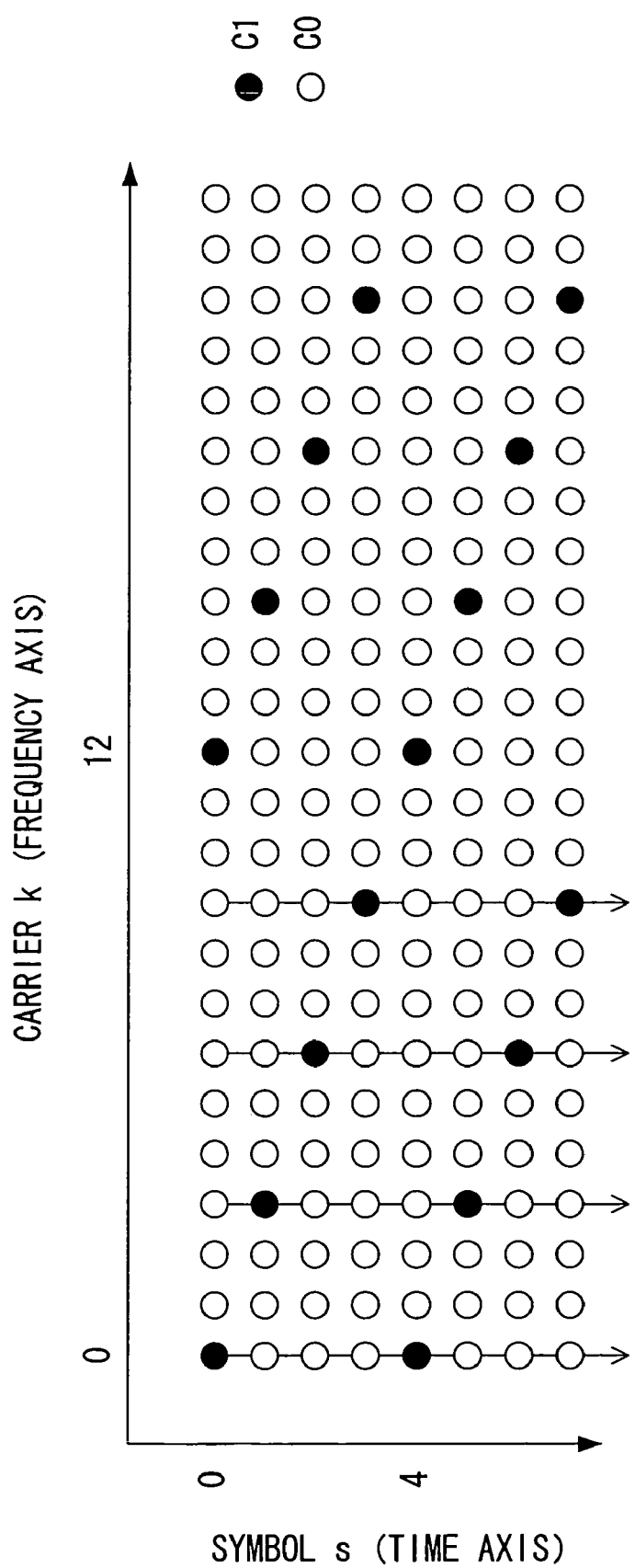
FIG. 3 is a view illustrating carriers and timings in which channel responses for pilot signals are obtained based on the OFDM signal having pilot signals inserted as shown in FIG. 2.

FIG. 3 is a view illustrating carriers and timings in which channel responses for pilot signals are obtained based on the OFDM signal having pilot signals inserted as shown in FIG. 2. In FIG. 3, the codes C1 denote combinations of carriers and timings in which channel responses for pilot signals are obtained, while the codes C0 denote combinations of carriers and timings in which channel responses for pilot signals are not obtained. As is found from FIG. 3, when viewed along the time axis, channel responses for pilot signals are obtained every four symbols for pilot signal-inserted carriers. It is therefore necessary to determine channel responses for data signals existing between the pilot signals by interpolation and the like.

The time axis interpolation section 30 performs interpolation in the symbol direction (along the time axis) (see the arrows in FIG. 3) based on channel responses for three pilot signals transmitted at predetermined symbols, to determine channel responses at the timings of symbols at which no pilot signal is transmitted, for each of pilot signal-inserted carriers, and outputs the results to the frequency axis interpolation section 23.

In other words, based on channel responses for the first, second and third pilot signals sequentially transmitted in the same carrier, the time axis interpolation section 30 determines channel responses at symbols between the time point of the second pilot signal and the time point of the third pilot signal (channel responses for data signals), and outputs the results to the frequency axis interpolation section 23. Note that the three pilot signals are called as the first, second and third pilot signals in the descending order of the time at which each signal is transmitted. The intervals between the pilot signals may be equal to or different from one another. The first to third pilot signals may be adjacent to one another, or another pilot signal may exist between any two of the first to third pilot signals.

Figure 4:
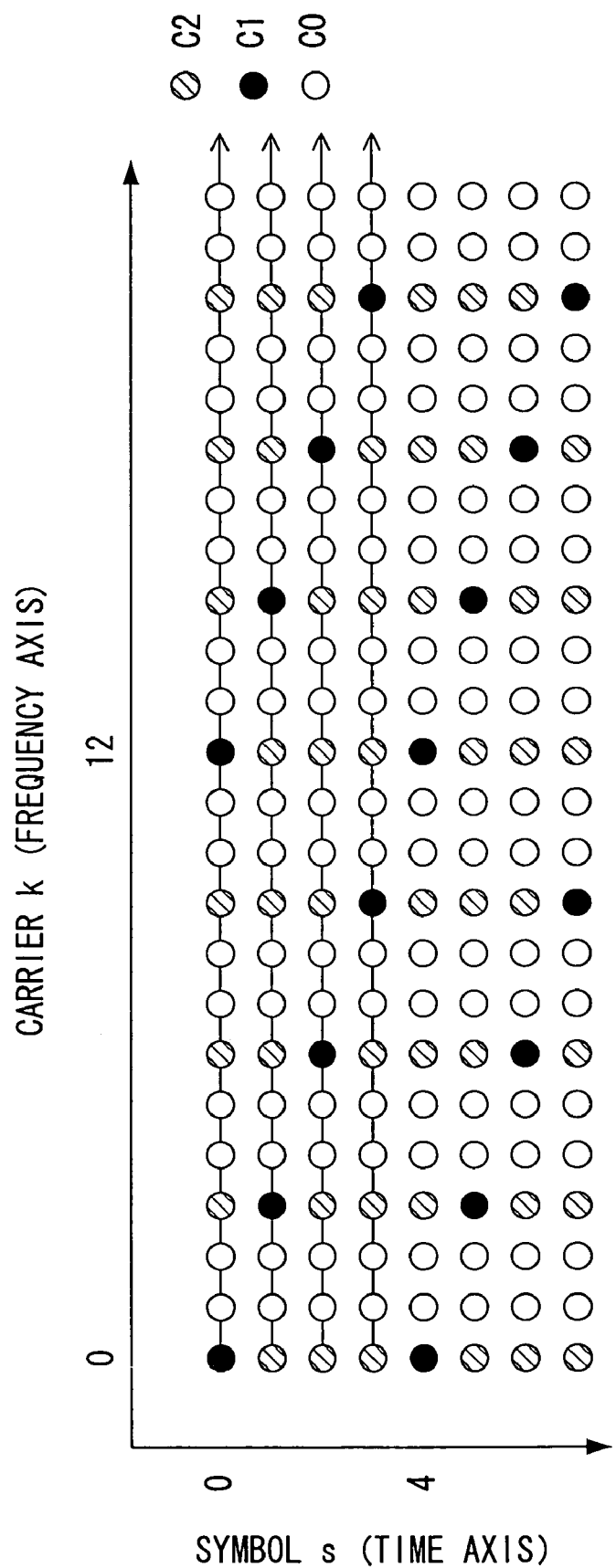
FIG. 4 is a view illustrating the results of interpolation performed along the time axis based on the channel responses for the pilot signals shown in FIG. 3.

FIG. 4 is a view illustrating the results of the interpolation performed along the time axis based on the channel responses for the pilot signals shown in FIG. 3. In FIG. 4, the codes C2 denote symbols at which channel responses are obtained by the interpolation along the time axis. The codes C0 and C1 denote the same as those in FIG. 3. As shown in FIG. 4, channel responses are determined for one carrier every three carriers by the interpolation along the time axis.

The frequency axis interpolation section 23 performs interpolation by filtering in the carrier direction (along the frequency axis) (see the arrows in FIG. 4) based on the channel responses for the pilot signal-inserted carriers determined by the time axis interpolation section 30, to determine channel responses for carriers transmitting no pilot signals, and outputs the results to the distortion compensation section 15.

Figure 5:
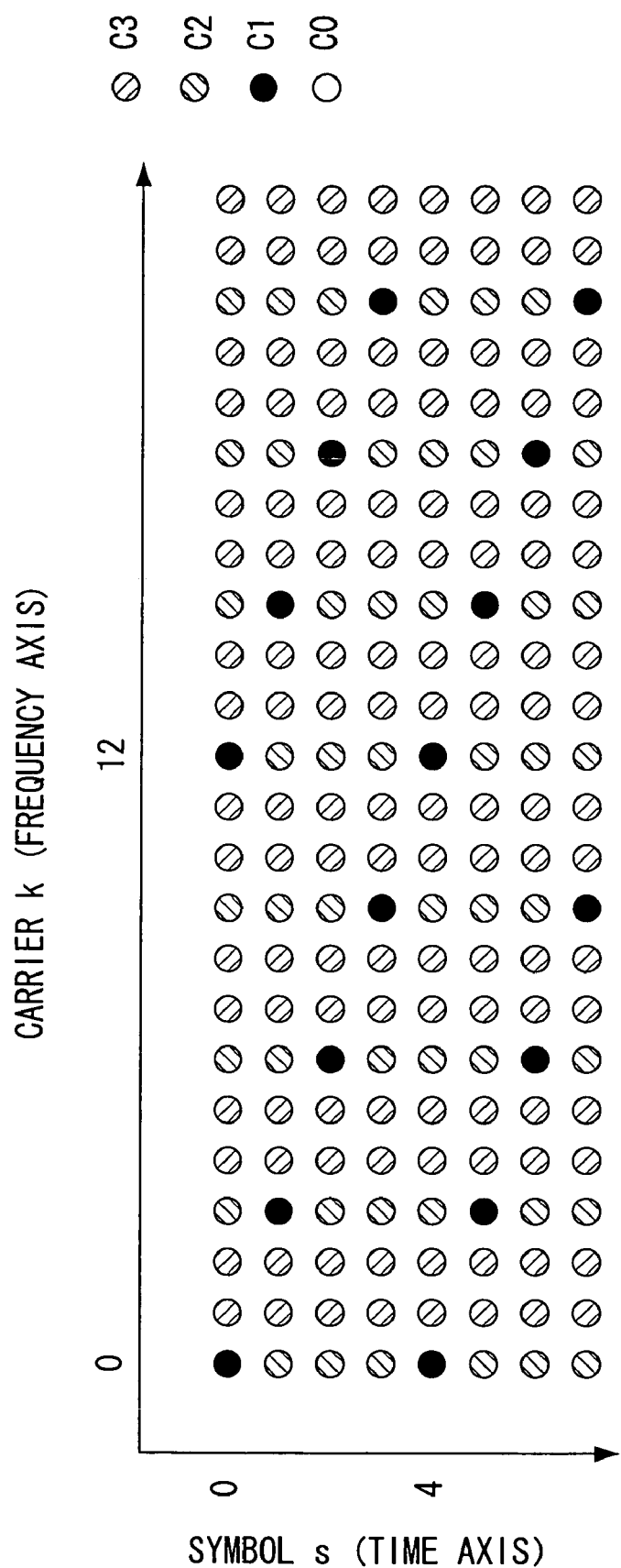
FIG. 5 is a view illustrating the results of interpolation performed along the frequency axis based on the results shown in FIG. 4.

FIG. 5 is a view illustrating the results of the interpolation performed along the frequency axis based on the results shown in FIG. 4. In FIG. 5, the codes C3 denote symbols at which channel responses are obtained by the interpolation along the frequency axis. The codes C0, C1 and C2 denote the same as those in FIG. 4. As shown in FIG. 5, channel responses are determined for all the symbols by the interpolation along the frequency axis.

The distortion compensation section 15 compensates (equalizes) a waveform distortion in the frequency-domain OFDM signal output from the FFT section 14 by executing an operation such as complex division for the received OFDM signal using the channel responses for all the carriers obtained by the frequency axis interpolation section 23, and outputs the resultant equalized signal to the error correction section 16. The error correction section 16 performs error correction for the waveform distortion-compensated signal (equalized signal) obtained by the distortion compensation section 15, to determine the transmitted data, and outputs the results.

Hereinafter, the operation of the time axis interpolation section 30 will be described in detail. Consider a carrier of a carrier index $k_p$ having pilot signals inserted at positions of symbol indexes $s=l_p-N, l_p, l_p+N, \ldots$ ($l_p$ is an integer and N is an integer equal to or more than 2) in a cycle of N symbols. For this carrier, the time axis interpolation section 30 determines channel responses at symbols between the symbol indexes $s=l_p$ and $s=l_p+N$ based on the channel responses for the first, second and third pilot signals at the symbol indexes $s=l_p-N, l_p$ and $l_p+N$, respectively. As an example, the case that N=4 will be described.

Assuming that the channel response at a symbol index s for a carrier of a carrier index $k_p$ is represented by $H(s, k_p)$, the channel responses for the pilot signals at the symbol indexes $s=l_p-4, l_p$ and $l_p+4$ for this carrier are respectively denoted by $H(l_p-4, k_p), H(l_p, k_p)$ and $H(l_p+4, k_p)$. In general, the channel responses are represented by complex vectors.

First, for the carrier of a carrier index $k_p$, channel responses $Ha(s, k_p)$ for data signals between the symbol indexes $s=l_p$ and $s=l_p+4$ are determined by linear extrapolation (prediction) based on the channel responses for the pilot signals at the symbol indexes $s=l_p-4$ and $l_p$. The linear extrapolation is a method in which a point that exterior-divides a line segment connecting points representing channel responses for two temporally continuous pilot signals is determined, and the value expressed by this point is estimated as the channel response for a data signal input after the two pilot signals. By the linear extrapolation, future channel responses can be predicted and estimated from a change in the past channel responses.

The channel responses $Ha(s, k_p)$ ($l_p+1 \leq s \leq l_p+3$) for data signals between the symbol indexes $s=l_p$ and $s=l_p+4$ obtained by linear extrapolation are as follows.

$$Ha(l_p+1, k_p) = H(l_p, k_p) + (1/4) \cdot \{H(l_p, k_p) - H(l_p-4, k_p)\} \quad (1a)$$

$$Ha(l_p+2, k_p) = H(l_p, k_p) + (2/4) \cdot \{H(l_p, k_p) - H(l_p-4, k_p)\} \quad (1b)$$

$$Ha(l_p+3, k_p) = H(l_p, k_p) + (3/4) \cdot \{H(l_p, k_p) - H(l_p-4, k_p)\} \quad (1c)$$

Thereafter, for the carrier of the carrier index $k_p$, channel responses $Hb(s, k_p)$ for the data signals between the symbol indexes $s=l_p$ and $s=l_p+4$ are determined by linear interpolation based on the channel responses for the pilot signals at the symbol indexes $s=l_p$ and $l_p+4$. The linear interpolation is a method in which a point that interior-divides a line segment connecting points representing channel responses for two temporally continuous pilot signals is determined, and the value expressed by this point is estimated as the channel response for a data signal between the two pilot signals.

The channel responses $Hb(s, k_p)$ ($l_p+1 \leq s \leq l_p+3$) for the data signals between the symbol indexes $s=l_p$ and $s=l_p+4$ obtained by linear interpolation are as follows.

$$Hb(l_p+1, k_p) = (3/4) \cdot H(l_p, k_p) + (1/4) \cdot H(l_p+4, k_p) \quad (2a)$$

$$Hb(l_p+2, k_p) = (1/2) \cdot H(l_p, k_p) + (1/2) \cdot H(l_p+4, k_p) \quad (2b)$$

$$Hb(l_p+3, k_p) = (1/4) \cdot H(l_p, k_p) + (3/4) \cdot H(l_p+4, k_p) \quad (2c)$$

Thereafter, the time axis interpolation section 30 executes an operation (linear operation) including multiplying the channel responses Ha and Hb obtained by linear extrapolation and linear interpolation by coefficients $\alpha$ ($\alpha \neq 0$) and $\beta$, respectively, and summing the multiplication results.

Specifically, the time axis interpolation section 30 determines channel responses $Hes(s, k_p)$ ($l_p+1 \leq s \leq l_p+3$) for the data signals between the symbol indexes $s=l_p$ and $s=l_p+4$ by linear operation represented by $$Hes(s, k_p) = \alpha \cdot Ha(s, k_p) + \beta \cdot Hb(s, k_p) \quad (3)$$

($l_p+1 \leq s \leq l_p+3, \alpha \neq 0$)

using both linear extrapolation and linear interpolation.

In other words, for a pilot signal-inserted carrier, assuming that three pilot signals transmitted at predetermined symbol intervals on the time axis are called first, second and third pilot signals in the descending order of the time at which each signal is transmitted, the time axis interpolation section 30 executes the linear operation represented by the expression (3) for the channel responses between the second and third pilot signals obtained by the linear extrapolation and the channel responses between the second and third pilot signals obtained by the linear interpolation, to determine channel responses for data signal between the second and third pilot signals.

The expressions (1a) to (1c) and (2a) to (2c) can be substituted into the expression (3) to obtain the followings.

$$Hes(l_p+1, k_p) = (-\alpha/4) \cdot H(l_p-4, k_p) + \{(5 \cdot \alpha + 3 \cdot \beta)/4\} \cdot H(l_p, k_p) + (\beta/4) \cdot H(l_p+4, k_p) \quad (4a)$$

$$Hes(l_p+2, k_p) = (-\alpha/2) \cdot H(l_p-4, k_p) + \{(3 \cdot \alpha + \beta)/2\} \cdot H(l_p, k_p) + (\beta/2) \cdot H(l_p+4, k_p) \quad (4b)$$

$$Hes(l_p+3, k_p) = (-3 \cdot \alpha/4) \cdot H(l_p-4, k_p) + \{(7 \cdot \alpha + \beta)/4\} \cdot H(l_p, k_p) + (3 \cdot \beta/4) \cdot H(l_p+4, k_p) \quad (4c)$$

($\alpha \neq 0$ in expressions (4a) to (4c))

From the expressions (4a) to (4c), it is understood that assuming that three pilot signals transmitted at predetermined symbol intervals on the time axis are called as first, second and third pilot signals in the descending order of the time at which each signal is transmitted, the time axis interpolation section 30 determines channel responses for data signals between the second and third pilot signals by executing linear operation of the channel responses for the first, second and third pilot signals.

As described above, the time axis interpolation section 30 may directly determine channel responses for data signals between the second and third pilot signals using the channel responses for the first to third pilot signals according to the expressions (4a) to (4c). In this case, the number of steps required for the operation can be made smaller than the case of the expression (3).

The expressions (1a) to (1c) and (2a) to (2c) can be generalized as follows. It is assumed that pilot signals are inserted every N symbols, which also applies to generalized expressions to follow.

$$Ha(l_p+m, k_p) = -m/N \cdot H(l_p-N, k_p) + (N+m)/N \cdot H(l_p, k_p)$$

$$Hb(l_p+m, k_p) = (N-m)/N \cdot H(l_p, k_p) + m/N \cdot H(l_p+N, k_p)$$

(m is an integer satisfying $1 \leq m \leq N-1$)

From the above, the expressions (4a) to (4c) can be generalized as follows.

$$Hes(l_p+m, k_p) = \quad (5)$$
$$-(\alpha \cdot m/N) \cdot H(l_p-N, k_p) + [\{\alpha \cdot (N+m) + \beta \cdot (N-m)\}/N] \cdot H(l_p, k_p) + (\beta \cdot m/N) \cdot H(l_p+N, k_p)$$

($\alpha$ and $\beta$ are real numbers satisfying $\alpha \neq 0$, and m is an integer satisfying $1 \leq m \leq N-1$)

The expressions (4a) and (4b) correspond to the case where N=4 in the expression (5).

In the expression (3), $\alpha = u$ and $\beta = 1-u$ ($0 < u \leq 1$) may be set to ensure that the channel response Hes(s, $k_p$) is a value somewhere between the channel response Ha(s, $k_p$) obtained by extrapolation and the channel response Hb(s, $k_p$) obtained by interpolation. That is, the channel response may be determined by the following expression.

$$Hes(s, k_p) = u \cdot Ha(s, k_p) + (1-u) \cdot Hb(s, k_p) \quad (6)$$

$$(l_p+1 \leq s \leq l_p+3, \, 0 < u \leq 1)$$

In this case, the coefficient u indicates the proportion of the linear extrapolation component in the channel response Hes.

It is considered that the error of prediction of the linear-extrapolated channel response Ha will increase with the lapse of time from the acquirement of data used for the prediction. In consideration of this, in determination of a channel response using both linear extrapolation and linear interpolation, the contribution of the channel response Ha obtained by prediction may be reduced with time. That is, the coefficient $\alpha$ or u may be reduced with increase of the symbol index. This can further improve the estimation accuracy of sharply changing channel responses.

For example, in determination of channel responses for three symbols between pilot signals, coefficients $u_1$, $u_2$ and $u_3$ ($u_1 \geq u_2 \geq u_3$, $u_1 \neq 0$) of fixed values may be prepared in advance for these symbols, and using these coefficients, the channel responses Hes(s, $k_p$) ($l_p+1 \leq s \leq l_p+3$) may be determined according to the following expressions.

$$Hes(l_p+1, k_p) = u_1 \cdot Ha(l_p+1, k_p) + (1-u_1) \cdot Hb(l_p+1, k_p) \quad (7a)$$

$$Hes(l_p+2, k_p) = u_2 \cdot Ha(l_p+2, k_p) + (1-u_2) \cdot Hb(l_p+2, k_p) \quad (7b)$$

$$Hes(l_p+3, k_p) = u_3 \cdot Ha(l_p+3, k_p) + (1-u_3) \cdot Hb(l_p+3, k_p) \quad (7c)$$

($u_1 \geq u_2 \geq u_3$, $u_1 \neq 0$ in the expressions (7a) to (7c))

The above expressions can be put together and generalized into the following expression.

$$Hes(l_p+m, k_p) = u_m \cdot Ha(l_p+m, k_p) + (1-u_m) \cdot Hb(l_p+m, k_p) \quad (8)$$

($u_m$ is a real number satisfying $u_1 \neq 0$ and $u_1 \geq u_2 \geq \ldots \geq u_m \geq \ldots \geq u_{N-1}$, and m is an integer satisfying $1 \leq m \leq N-1$)

The expressions (7a) to (7c) correspond to the case where N=4 in the expression (8).

The expressions (1a) to (1c) and (2a) to (2c) can be substituted into the expressions (7a) to (7c) to obtain the followings.

$$Hes(l_p+1, k_p) = (-u_1/4) \cdot H(l_p-4, k_p) + \quad (9a)$$
$$\{(3+2 \cdot u_1)/4\} \cdot H(l_p, k_p) + \{(1-u_1)/4\} \cdot H(l_p+4, k_p)$$

$$Hes(l_p+2, k_p) = (-u_2/2) \cdot H(l_p-4, k_p) + \quad (9b)$$
$$\{(1+2 \cdot u_2)/4\} \cdot H(l_p, k_p) + \{(1-u_2)/2\} \cdot H(l_p+4, k_p)$$

$$Hes(l_p+3, k_p) = (-3 \cdot u_3/4) \cdot H(l_p-4, k_p) + \quad (9c)$$
$$\{(1+6 \cdot u_3)/4\} \cdot H(l_p, k_p) + \{3 \cdot (1-u_3)/4\} \cdot H(l_p+4, k_p)$$

In the above case, also, the channel responses Hes(s, $k_p$) ($l_p+1 \leq s \leq l_p+3$) can be determined by performing linear operation for three pilot signals.

The above expressions can be put together and generalized based on the expression (8) into the following expression.

$$Hes(l_p+m, k_p) = \quad (10)$$
$$-(u_m \cdot m/N) \cdot H(l_p-N, k_p) + \{(2 \cdot u_m \cdot m + N - m)/N\} \cdot H(l_p, k_p) +$$
$$\{(1-u_m) \cdot m/N\} \cdot H(l_p+N, k_p)$$

($u_m$ is a real number satisfying $u_1 \neq 0$ and $u_1 \geq u_2 \geq \ldots \geq u_m \geq \ldots \geq u_{N-1}$, and m is an integer satisfying $1 \leq m \leq N-1$)

The expressions (9a) to (9c) correspond to the case where N=4 in the expression (10).

Figure 6:
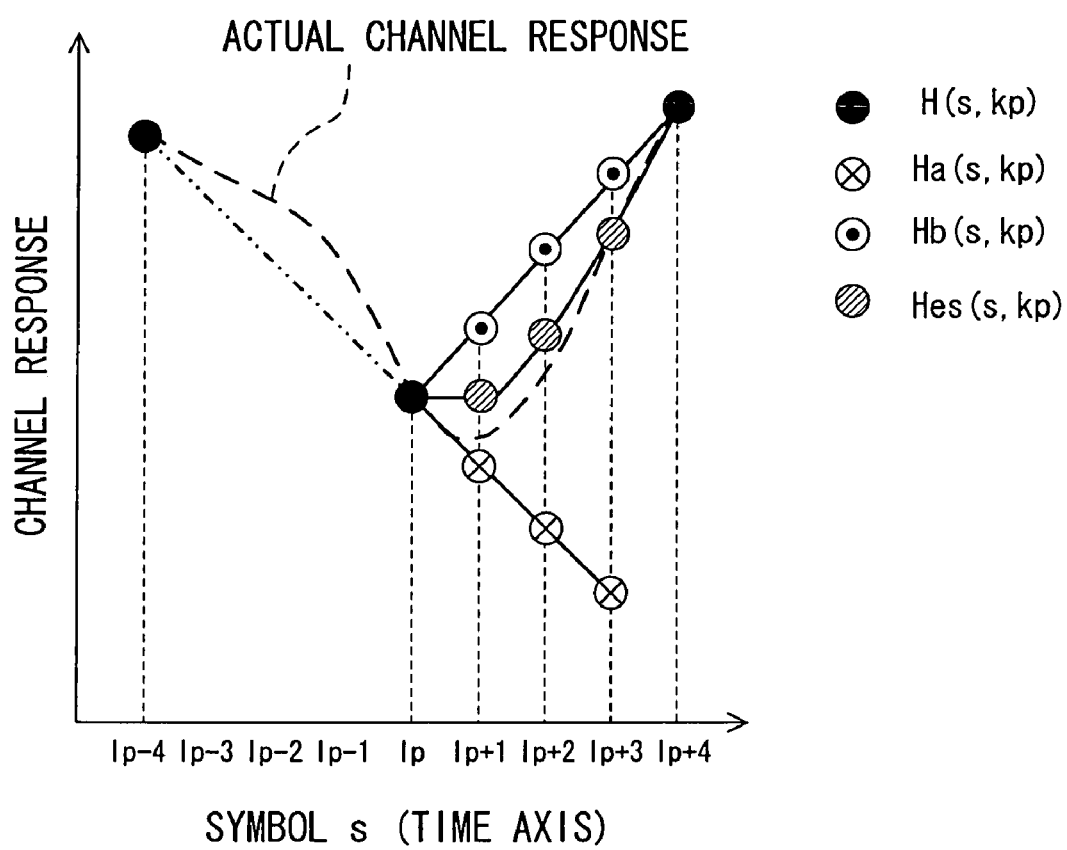
FIG. 6 is a view showing an example of channel responses Hes(s, $k_p$) determined based on channel responses Ha(s, $k_p$) obtained by linear extrapolation and channel responses Hb(s, $k_p$) obtained by linear interpolation.

FIG. 6 is a view showing an example of the channel responses Hes(s, $k_p$) determined based on the linear-extrapolated channel responses Ha(s, $k_p$) and the linear-interpolated channel responses Hb(s, $k_p$). In FIG. 6, the channel responses that are complex vectors are represented as scalars for convenience of description.

In FIG. 6, an example of actual channel responses is shown by the dashed line. Note that the actual channel responses abruptly change due to the influence of fading and the like. Note also that when the channel responses Hes(s, $k_p$) are determined according to the expression (8), for example, the following relationship is established.

$$Hes(l_p+m, k_p) - Ha(l_p+m, k_p) : Hb(l_p+m, k_p) - Hes(l_p+m, k_p) = 1 - u_m : u_m \, (1 \leq m \leq 3)$$

As shown in FIG. 6, the estimation error from the actual channel responses can be reduced for the channel responses Hes(s, $k_p$) determined by executing linear operation of the linear-extrapolated channel responses Ha(s, $k_p$) and the linear-interpolated channel responses Hb(s, $k_p$), compared with estimation error for Ha(s, $k_p$) and that for Hb(s, $k_p$).

In the above description, interpolation was performed between the symbol indexes $s=l_p$ and $l_p+4$ for a carrier of an index $k_p$ having pilot signals inserted at positions of symbol indexes $s=l_p-4, l_p, l_p+4, \ldots$, to determine Hes(s, $k_p$) ($l_p+1 \leq s \leq l_p+3$). The channel responses can also be determined for symbol indexes falling outside the range of $l_p+1 \leq s \leq l_p+3$. The interpolation is also possible for carriers, other than the carrier of the index $k_p$, having pilot signals inserted at positions other than the symbol indexes $s=l_p-4, l_p, l_p+4, \ldots$.

Next, a specific configuration of the time axis interpolation section 30 and the operation thereof will be described with reference to FIG. 1. The channel response calculation section 22 determines channel responses for pilot signals and outputs the results to the memory 31 and the operator 34. The controller 32 gives an instruction on the address for data write/read to the memory 31 and controls the operation of the operator 34. The memory 31 holds the input channel responses and outputs the held values to the operator 34 according to the instruction from the controller 32. Once receiving new channel responses, the memory 31 updates the holding channel responses at the timing of the next symbol.

In the case of the arrangement of symbols for transmitting pilot signals as shown in FIG. 2, in which pilot signals are inserted in one every three carriers, the memory 31 has a capacity of holding three values of channel responses each for one-third of the total number of carriers.

The operator 34 executes linear operation of any of the output of the channel response calculation section 22 and the channel responses held by the memory 31, appropriately selected, based on a predetermined operation pattern, for each symbol of a pilot signal-inserted carrier, to determine an interpolated channel response along the time axis, and outputs the results to the frequency axis interpolation section 23.

Figure 7:
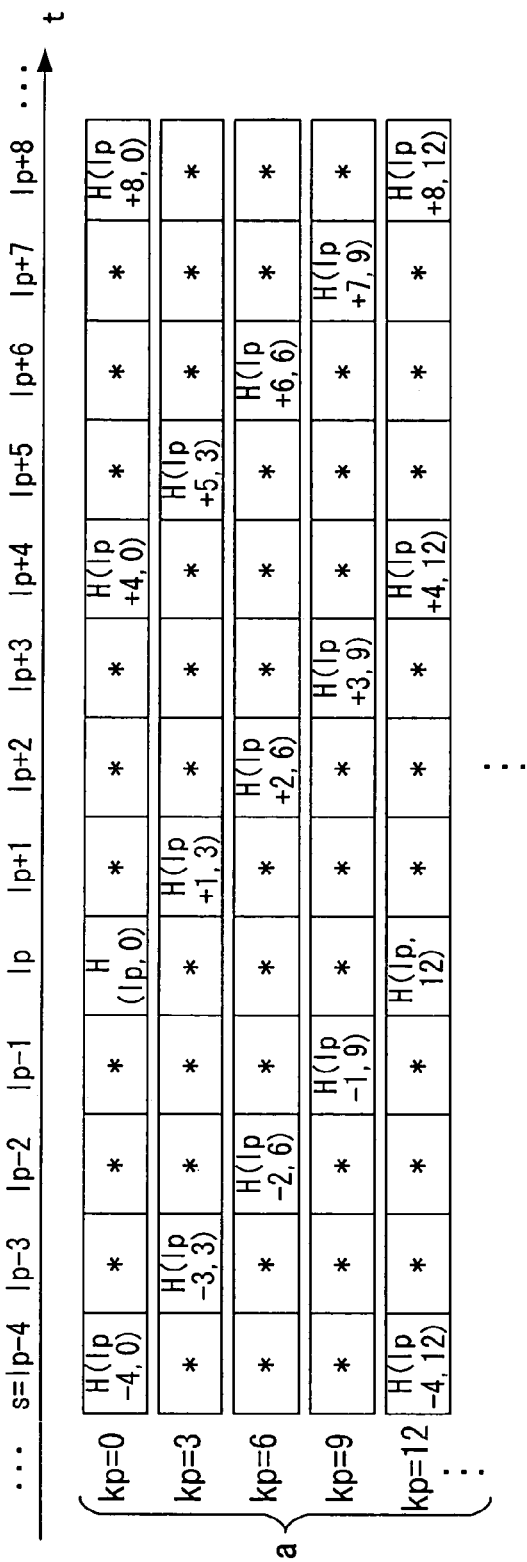
FIG. 7 is a timing chart showing values representing channel responses output from a channel response calculation section and a memory in FIG. 1.

FIG. 7 is a timing chart showing values representing the channel responses output from the channel response calculation section 22 and the memory 31 in FIG. 1. FIG. 8 is a timing chart showing other values representing channel responses allowed to be output from the memory 31 in FIG. 1.

In FIGS. 7 and 8, the channel response for a pilot signal of a carrier index $k_p$ at a symbol index s is represented by H(s, $k_p$). The carrier of a carrier index k=0 transmits pilot signals at symbols of symbol indexes s=$l_p$−4, $l_p$, $l_p$+4, $l_p$+8, . . . , and the carrier of a carrier index k=3 transmits pilot signals at symbols of symbol indexes s=$l_p$−3, $l_p$+1, $l_p$+5, $l_p$+9, . . . . In this way, the pilot signal-inserted carriers transmit pilot signals cyclically.

As shown in FIG. 7, the channel response calculation section 22 outputs a channel response H(s, $k_p$) for a pilot signal as a value a every four symbols for each of the pilot signal-inserted carriers of indexes $k_p$=0, 3, 6, . . . . Every time receiving a new channel response H(s, $k_p$) as the value a, the memory 31 holds the new one and outputs the held one as a value b at the timing of the next symbol, for each of the carriers of indexes $k_p$=0, 3, 6, . . . .

In addition, as shown in FIG. 8, every time receiving a new channel response H(s, $k_p$) as the value a, the memory 31 outputs, as required, a channel response H(s−4, $k_p$) and a channel response H(s−8, $k_p$), received previously and held therein, as values c and d, respectively, at the timing of the next symbol, for each of the carriers of indexes $k_p$=0, 3, 6, . . . .

For example, for the carrier of the carrier index $k_p$=0, the memory 31 can output channel responses H($l_p$+4, 0), H($l_p$, 0) and H($l_p$−4, 0) as the values b, c and d, respectively, at the time of the symbol index s=$l_p$+5.

Figure 10:
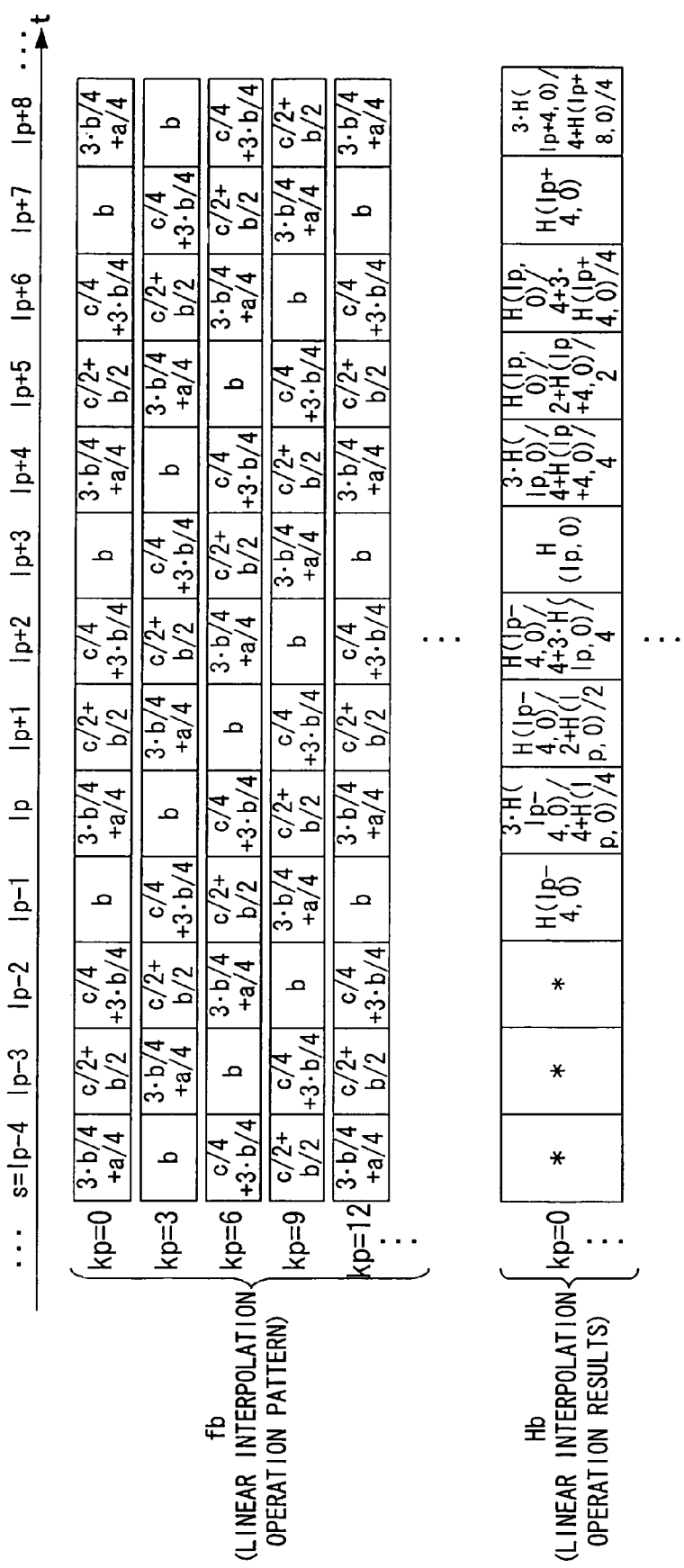
FIG. 10 is a timing chart for demonstrating interpolation operation executed by the operator in FIG. 1.
Figure 11:
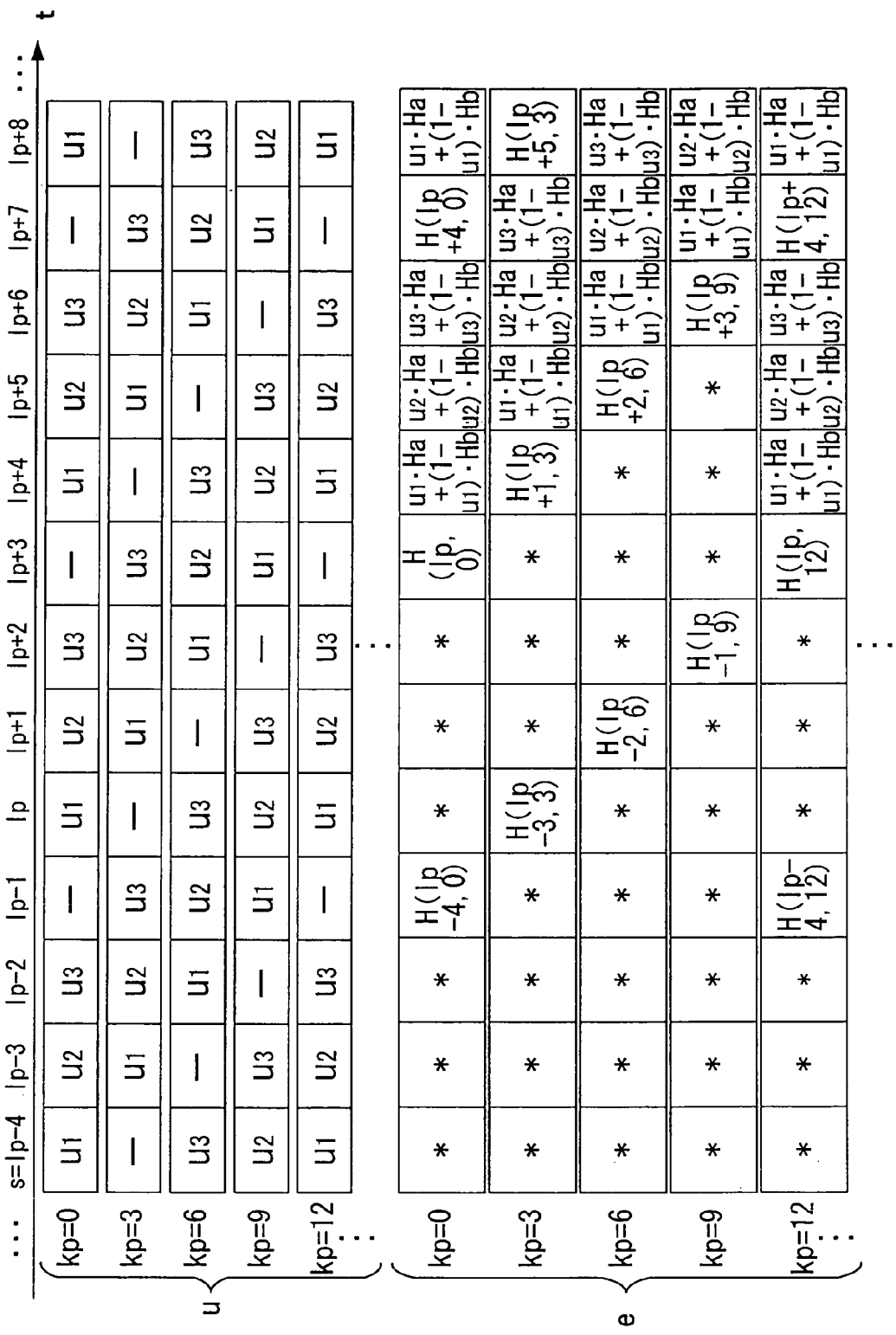
FIG. 11 is a timing chart for demonstrating the results of operation executed by the operator in FIG. 1.

FIG. 9 is a timing chart for demonstrating extrapolation operation executed by the operator 34 in FIG. 1. FIG. 10 is a timing chart for demonstrating interpolation operation executed by the operator 34 in FIG. 1. FIG. 11 is a timing chart illustrating the results of the operation executed by the operator 34 in FIG. 1.

In FIG. 9, a linear extrapolation operation pattern fa shows a pattern of operation used for the operator 34 to perform linear extrapolation, for the carriers of indexes $k_p$=0, 3, 6, . . . .

As shown in FIG. 9, for the carrier of the index $k_p$=0, for example, at the symbol index s=$l_p$+3, the operator 34 reads the channel response H($l_p$, 0) from the memory 31 as the value b (see FIG. 7), and determines the read value as the channel response Ha($l_p$, 0) obtained by linear extrapolation operation at the symbol index s=$l_p$ of this carrier. At s=$l_p$+4, the operator 34 reads the channel responses H($l_p$−4, 0) and H($l_p$, 0) from the memory 31 as the values c and b, respectively (see FIGS. 7 and 8), calculates −c/4+5·b/4 for the values c and b, and determines-the calculation results as the channel response Ha($l_p$+1, 0) obtained by linear extrapolation operation at the symbol index s=$l_p$+1 of this carrier.

Likewise, at s=$l_p$+5, the operator 34 reads the channel responses H($l_p$−4, 0) and H($l_p$, 0) from the memory 31 as the values d and c, respectively (see FIG. 8), calculates −d/2+3·c/2 for the values d and c, and determines the calculation results as the channel response Ha($l_p$+2, 0) obtained by linear extrapolation operation at the symbol index s=$l_p$+2 of this carrier. At s=$l_p$+6, the operator 34 reads the channel responses H($l_p$−4, 0) and H($l_p$, 0) from the memory 31 as the values d and c, respectively (see FIG. 8), calculates −3·d/4+7·c/4 for the values d and c, and determines the calculation results as the channel response Ha($l_p$+3, 0) obtained by linear extrapolation operation at the symbol index s=$l_p$+3 of this carrier. This series of operation is repeated in a cycle of four symbols.

In FIG. 10, a linear interpolation operation pattern fb shows a pattern of operation used for the operator 34 to perform linear interpolation, for the carriers of indexes $k_p$=0, 3, 6, . . . .

As shown in FIG. 10, for the carrier of the index $k_p$=0, for example, at the symbol index s=$l_p$+3, the operator 34 reads the channel response H($l_p$, 0) from the memory 31 as the value b, (see FIG. 7), and determines the read value as the channel response Hb($l_p$, 0) obtained by linear interpolation operation at the symbol index s=$l_p$ of this carrier. At s=$l_p$+4, the operator 34 reads the channel response H($l_p$, 0) from the memory 31 as the value b, calculates 3·b/4+a for the value b and the channel response H($l_p$+4, 0) received from the channel response calculation section 22 as the value a (see FIG. 7), and determines the calculation results as the channel response Hb($l_p$+1, 0) obtained by linear interpolation operation at the symbol index s=$l_p$+1 of this carrier.

Likewise, at s=$l_p$+5, the operator 34 reads the channel responses H($l_p$, 0) and H($l_p$+4, 0) from the memory 31 as the values c and b, respectively (see FIGS. 7 and 8), calculates c/2+b/2 for the values c and b, and determines the calculation results as the channel response Hb($l_p$+2, 0) obtained by linear interpolation operation at the symbol index s=$l_p$+2 of this carrier. At s=$l_p$+6, the operator 34 reads the channel responses H($l_p$, 0) and H($l_p$+4, 0) from the memory 31 as the values c and b, respectively (see FIGS. 7 and 8), calculates c/4+3·b/4 for the values c and b, and determines the calculation results as the channel response Hb($l_p$+3, 0) obtained by linear interpolation operation at the symbol index s=$l_p$+3 of this carrier. This series of operation is repeated in a cycle of four symbols.

As shown in FIGS. 9 and 10, the linear extrapolation operation pattern fa and the linear interpolation operation pattern fb are also set for the carriers other than the carrier of $k_p$=0 according to the timings of symbols for transmitting pilot signals.

In FIG. 11, a coefficient pattern u shows a pattern of the coefficient urn used when the operator 34 executes the operation of the expression (8), and operation results e shows values output from the operator 34.

The operator 34 determines the channel response Hes by executing linear operation of the channel responses Ha and Hb according to the expression (8) for each of the carriers of indexes $k_p$=0, 3, 6, . . . . At this operation, the operator 34 multiplies the channel response Ha by the coefficient $u_m$ given in FIG. 11 and multiplies the channel response Hb by the coefficient 1−$u_m$. The coefficient $u_m$ changes from $u_1$ to $u_2$ and further from $u_2$ to $u_3$, depending on the symbol index. In other words, the operator 34 determines the time-axis interpolated channel response based on the channel response Ha obtained by linear extrapolation, the channel response Hb obtained by linear interpolation, and the coefficient $u_m$ given in the coefficient pattern u, for each of the carriers of indexes $k_p$=0, 3, 6, . . . , and outputs the results as the operation results e.

It is found from the operation results e that the interpolated channel response is obtained by the reception apparatus of FIG. 1 with delay of three symbols, which is the same as that in the case of obtaining the channel response by only linear interpolation.

The operations in FIGS. 9 to 11 are executed for the respective carriers of indexes $k_p$=0, 3, 6, . . . sequentially for the time of one symbol index, and then the operations for the time of the next symbol index are executed.

In the above description, the operator 34 determined the channel response Hes according to the expressions (1a) to (1c), (2a) to (2c) and (8) with reference to the timing charts. Alternatively, the channel response Hes may be directly determined from the channel responses H for pilot signals according to the expression (10) (specifically, the expressions (9a) to (9c)) without determining the channel responses Ha and Hb.

As described above, according to the reception apparatus of this embodiment, in estimation of channel responses that sharply change due to the influence of fading and the like, the error from the actual channel responses can be reduced, while the circuit size being kept small, by determining the channel responses using both linear extrapolation and linear interpolation.

Moreover, by setting $(u_1, u_2, u_3)=(3/8, 1/4, 1/8)$ in the expression (8) or (10), the same value of channel response as that obtained by quadratic interpolation can be obtained using the channel responses for the first to third pilot signals. The quadratic interpolation as used herein is an operation including connecting points representing the channel responses for the first to third pilot signals in the form of a quadric curve and determining points on the quadric curve as interpolated channel responses, for each component. Using the quadratic interpolation to determine a channel response often permits estimation of a value closer to the actual channel response than using the linear interpolation.

The reason why the same of channel response as that obtained by quadratic interpolation can be obtained by the expression (8) or (10) that is a linear expression will be described in an analytic way. In general, a channel response is a complex vector having an I axis component and a Q axis component. In the following description, however, the channel response for a pilot signal will be described as a scalar for convenience of description.

Figure 12:
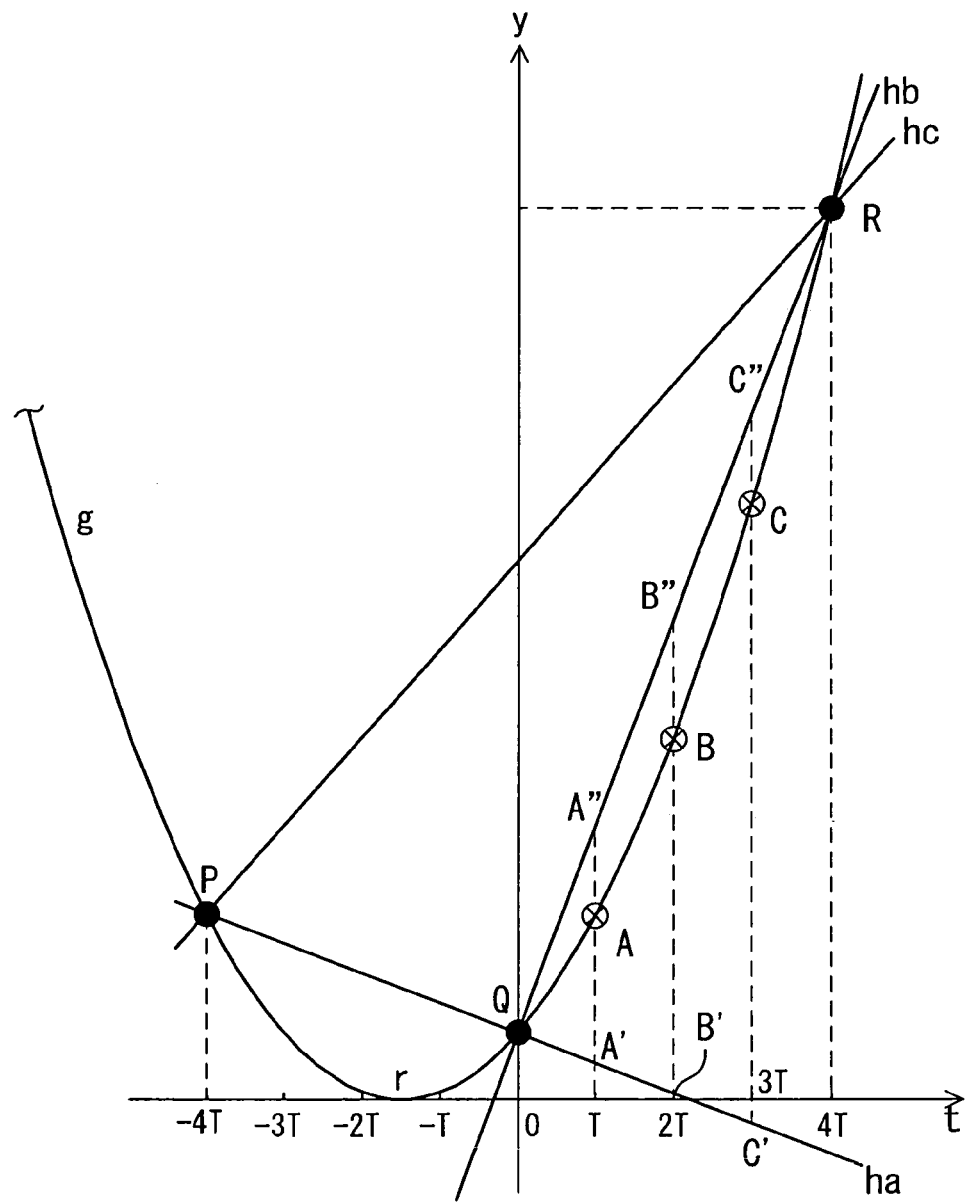
FIG. 12 is a view for demonstrating quadratic interpolation.

FIG. 12 is a view for demonstrating quadratic interpolation. In FIG. 12, the x-axis represents the time t, and the y-axis represents the value y of the channel response. Assume that the channel responses for the first, second and third pilot signals are obtained at times t=−4T, 0, 4T (T is a symbol interval), respectively, and the points representing these channel responses are denoted by points P, Q and R, respectively, on the t-y plane.

First, a quadric curve g passing through the points P, Q and R on the t-y plane can be expressed by $$g: y = q \cdot (t-r)^2 \quad (q \text{ and } r \text{ are real numbers})$$

(the t axis was shifted to come into contact with the quadric curve g). A straight line ha passing through the points P and Q and a straight line hb passing through the points Q and R are expressed as follows.

$$ha: y = -2 \cdot q \cdot (2 \cdot T + r) \cdot t + q \cdot r^2$$

$$hb: y = 2 \cdot q \cdot (2 \cdot T - r) \cdot t + q \cdot r^2$$

The straight line ha represents the channel responses Ha in the range of $0 \leq t \leq 4T$ obtained by linear extrapolation (prediction), and the straight line hb represents the channel responses Hb in the range of $0 \leq t \leq 4T$ obtained by linear interpolation.

The coordinates of point A on the quadric curve g, point A' on the straight line ha and point A" on the straight line hb at the time t=T are as follows.

$$A (T, q \cdot (T-r)^2)$$

$$A' (T, -2 \cdot q \cdot T \cdot (2 \cdot T + r) + q \cdot r^2)$$

$$A'' (T, 2 \cdot q \cdot T \cdot (2 \cdot T - r) + q \cdot r^2)$$

Therefore, the lengths of a line segment AA' and a line segment AA" are as follows.

$$AA' = 5 \cdot |q| \cdot T^2$$

$$AA'' = 3 \cdot |q| \cdot T^2$$

This indicates that the point A is a point interior-dividing the line segment A'A" into 5:3 irrespective of the values of q and r. It is therefore understood that the channel response obtained by quadratic interpolation at a time t=T can be obtained from the linear-extrapolated channel response Ha and the linear-interpolated channel response Hb at this time by executing linear operation.

Likewise, BB"/BB'=⅓ is established for point B' on the straight line ha and point B" on the straight line hb at the time t=2T, and CC"/CC'=⅐ is established for point C' on the straight line ha and point C" on the straight line hb at the time t=3T. It is therefore also understood that the channel responses obtained by quadratic interpolation at times t=2T and 3T can be obtained from the linear-extrapolated channel responses Ha and the linear-interpolated channel responses Hb at these times by executing linear operation.

That is, by setting $(u_1, u_2, u_3)=(3/8, 1/4, 1/8)$ in the expression (8) or (10), it is possible to determine the point A interior-dividing the line segment A'A" into 5:3, the point B interior-dividing the line segment B'B" into 3:1, and the point C interior-dividing the line segment C'C" into 7:1, as in FIG. 12, and thus obtain the same values of channel responses as those obtained by quadratic interpolation.

As described above, a channel response obtainable by quadratic interpolation can be determined correctly, without the necessity of resolving a quadratic equation, by multiplying the linear-extrapolated channel response Ha and the linear-interpolated channel response Hb by their uniquely determined coefficients and executing linear operation of the multiplied results. In other words, a quadratic-interpolated channel response can be determined by executing only linear operation. This suppresses increase of the circuit size of the time axis interpolation section and also enables estimation of a value close to the actual channel response at high speed.

Alternatively, straight line hc passing through the points P and R may be considered in addition to the straight lines ha and hb, and a quadratic-interpolated channel response may be determined based on values obtained from any two straight lines among the straight lines ha, hb and hc at the times T, 2T and 3T. In this case, the coefficients $u_1$, $u_2$ and $u_3$ may be determined in advance for each combination of the two straight lines.

In view of the above, a new channel response is defined as follows, in addition to the channel response $Ha(s, k_p)$ ($l_p+1 \leq s \leq l_p+3$) obtained by linear extrapolation given by the expressions (1a) to (1c), and the channel response $Hb(s, k_p)$ ($l_p+1 \leq s \leq l_p+3$) obtained by linear interpolation given by the expressions (2a) to (2c) described above. Specifically, a channel response obtained from an interior-divided value of a line segment connecting the channel responses at the symbol indexes $s=l_p-4$ and $s=l_p+4$ is newly defined as a "skip linear-interpolated channel response".

Channel responses $Hc(s, k_p)$ ($l_p+1 \leq s \leq l_p+3$) obtained by skip linear interpolation, as the channel responses for data signals between the symbol indexes $s=l_p$ and $s=l_p+4$, are expressed as follows.

$$Hc(l_p+1, k_p) = (3/8) \cdot H(l_p-4, k_p) + (5/8) \cdot H(l_p+4, k_p) \quad (11a)$$

$$Hc(l_p+2, k_p) = (1/4) \cdot H(l_p-4, k_p) + (3/4) \cdot H(l_p+4, k_p) \quad (11b)$$

$$Hc(l_p+3, k_p) = (1/8) \cdot H(l_p-4, k_p) + (7/8) \cdot H(l_p+4, k_p) \quad (11c)$$

The above expressions can be generalized as in the expression (5) as follows.

$$Hc(l_p + m, k_p) = \qquad (12)$$
$$(N-m)/(2 \cdot N) \cdot H(l_p - N, k_p) + (N+m)/(2 \cdot N) \cdot H(l_p + N, k_p)$$

(m and N are integers satisfying $1 \leq m \leq N-1$)

The expressions (11a) to (11c) correspond to the case where N=4 in the expression (12).

The linear sum of the channel response Hc obtained from any of the above expressions (11a) to (11c) and the channel response Ha, or the linear sum of the channel response Hc and the channel response Hb may be determined as the channel response Hes, in place of determining the linear sum of the channel responses Ha and Hb as the channel response Hes as shown in the expression (8). That is, Hes may be determined from $$Hes(l_p+m, k_p) = u_m \cdot Hc(l_p+m, k_p) + (1-u_m) \cdot Ha(l_p+m, k_p) \qquad (13)$$

(m and N are integers satisfying $1 \leq m \leq N-1$, and $u_m$ is a real number satisfying $|u_m| < 1$), or $$Hes(l_p+m, k_p) = u_m \cdot Hc(l_p+m, k_p) + (1-u_m) \cdot Hb(l_p+m, k_p) \qquad (14)$$

(m and N are integers satisfying $1 \leq m \leq N-1$, and urn is a real number satisfying $u_1 \neq 0$ and $|u_m| < 1$).

Alternatively, the following expression obtained by expanding the expression (13), $$Hes(l_p + m, k_p) = \{u_m \cdot N + (u_m - 2) \cdot m\}/(2 \cdot N) \cdot H(l_p - N, k_p) + \qquad (15)$$
$$(1 - u_m)(N + m)/N \cdot H(l_p, k_p) +$$
$$u_m \cdot (N + m)/(2 \cdot N) \cdot H(l_p + N, k_p)$$

or the following expression obtained by expanding the expression (14), $$Hes(l_p + m, k_p) = u_m \cdot (N - m)/(2 \cdot N) \cdot H(l_p - N, k_p) + \qquad (16)$$
$$(1 - u_m)(N - m)/N \cdot H(l_p, k_p) +$$
$$\{u_m \cdot N + (2 - u_m) \cdot m/(2 \cdot N)\} \cdot H(l_p + N, k_p)$$

may be used.

With increase of the value of m, the value of $u_m$ is increased in the expressions (13) and (15), while it is decreased in the expressions (14) and (16).

In the case of N=4, estimation results obtainable by quadratic interpolation are obtained by setting the values of $u_m$ as follows. That is, in the expressions (13) and (15), $$(u_1, u_2, u_3) = (\frac{1}{4}, \frac{1}{2}, \frac{3}{4})$$

may be set, and in the expressions (14) and (16), $$(u_1, u_2, u_3) = (-\frac{1}{4}, -\frac{1}{2}, -\frac{3}{4})$$

may be set.

In the above description, channel responses obtainable by quadratic interpolation were obtained by linear operation. Likewise, channel responses represented by points on a cubic curve passing through points representing channel responses for four pilot signals can also be obtained by linear operation.

That is, first, based on channel responses corresponding to first, second, third and fourth pilot signals sequentially transmitted in a same carrier, respective points representing the channel responses for the first to fourth pilot signals are determined on the plane that gives the channel responses with respect to the symbols. The determined four points are grouped into two, to obtain two straight lines each passing through the two points of each group. Points on the two straight lines at a symbol of the same timing are determined, and linear operation is performed for values indicated by the points. As a result, determined is a channel response represented by a point on a cubic curve passing through the points representing the channel responses for the first to fourth pilot signals. The coefficients used in the linear operation can be determined uniquely for each symbol.

As described above, in this embodiment, for a pilot signal-inserted carrier, channel responses are obtained using both linear extrapolation and linear interpolation based on the channel responses for the first to third pilot signals transmitted at predetermined symbol intervals. This makes it possible to determine channel responses that are small in the error from the actual channel responses, without so much increasing the circuit size, even in a reception environment in which channel responses change vigorously due to the influence of fading and the like.

First Alteration to Embodiment 1

In the reception apparatus of FIG. 1, in determination of channel responses for signals between the second and third pilot signals, linear operation was executed for the linear-extrapolated channel responses Ha and the linear interpolated channel responses Hb using the predefined coefficients $u_1$, $u_2$ and $u_3$ as in the expression (8) or (10). In the following alteration, the values of the coefficients $u_1$, $u_2$ and $u_3$ are be changed according to the receiving state.

Figure 13:
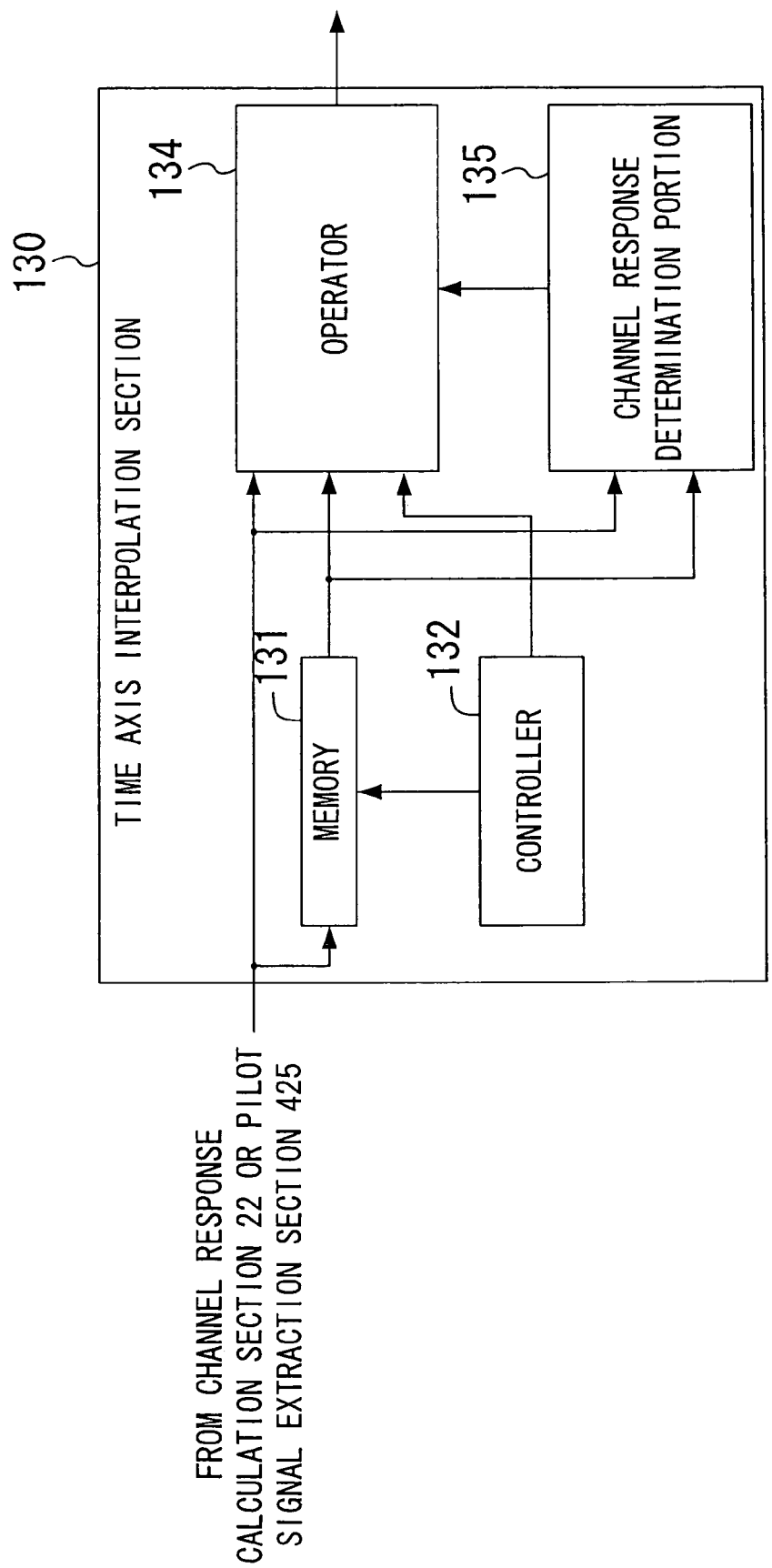
FIG. 13 is a block diagram showing a configuration of a time axis interpolation section of a reception apparatus of a first alteration to Embodiment 1.

FIG. 13 is a block diagram of a configuration of a time axis interpolation section 130 of a reception apparatus of a first alteration to Embodiment 1. The reception apparatus of this alteration is different from the reception apparatus of FIG. 1 in that the time axis interpolation section 130 is provided in place of the time axis interpolation section 30. The other components are the same as those described with reference to FIG. 1 and thus denoted by the same reference numerals. Description of these components is therefore omitted here. The time axis interpolation section 130 includes a channel response determination portion 135 in addition to the components of the time axis interpolation section 30 in FIG. 1. The time axis interpolation section 130 includes a memory 131, a controller 132, an operator 134 and the channel response determination portion 135. The, memory 131 and the controller 132 respectively correspond to the memory 31 and the controller 32 in FIG. 1.

The channel response determination portion 135 receives channel responses for pilot signals output from the channel response calculation section 22 and the memory 131, determines the extent of the change in channel responses for pilot signals, and outputs the determination results to the operator 134 as channel change information.

The operation of the channel response determination portion 135 will be described. As described in Embodiment 1, for a pilot signal of a carrier of a carrier index $k_p$, the channel response output from the channel response calculation section 22 and a plurality of channel responses held in the memory 131 are those given at timings different by one cycle of pilot signals.

Assume that $H(l_p-4, k_p)$, $H(l_p, k_p)$ and $H(l_p+4, k_p)$ were obtained as channel responses for the first, second and third pilot signals at the symbol indexes $s=l_p-4$, $l_p$ and $l_p+4$, respectively (the channel response determination portion 135 makes selection from the plurality of channel responses held in the memory 131 and the channel response output from the channel response calculation section 22 according to the symbol index, and the combination of the selected channel responses changes every moment).

The channel response determination portion 135 determines the extent of the change in channel responses during the time from the symbol index $s=l_p-4$ to $s=l_p+4$ via $s=l_p$.

Figure 14:
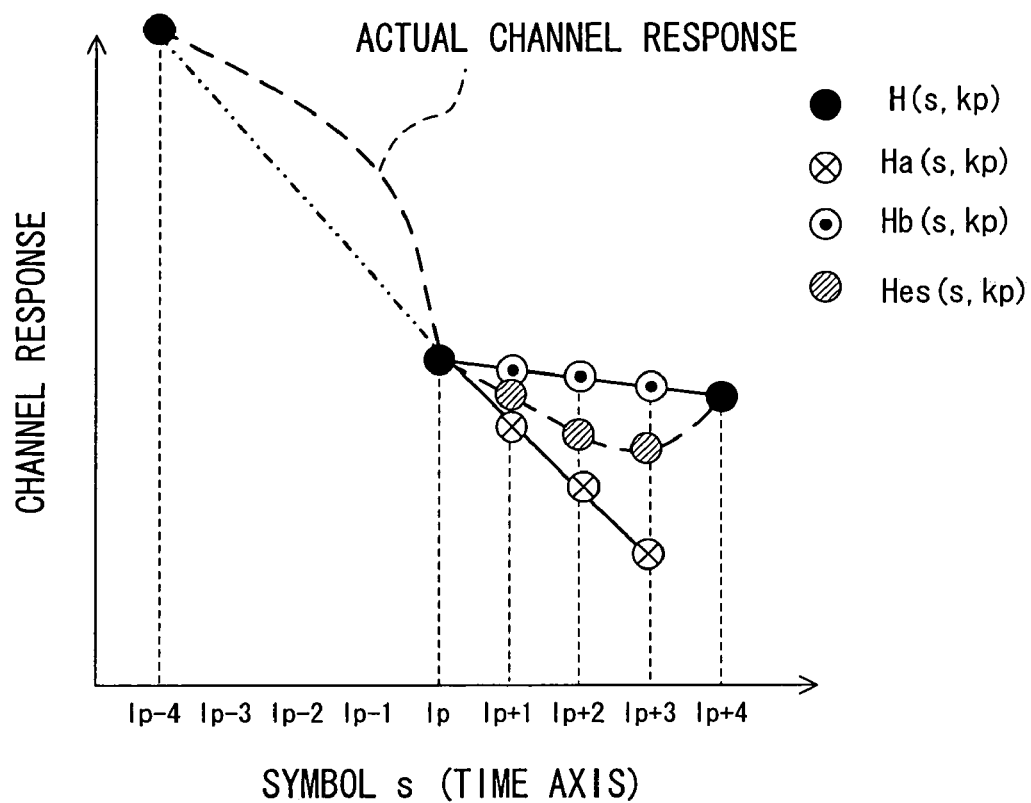
FIG. 14 is a view showing a case that channel responses change monotonously (decrease monotonously).

FIG. 14 is a view showing an example of the case that the change in channel responses is monotonous (case of monotonous decrease). When the channel responses as shown in FIG. 14 are obtained, for example, the channel response determination portion 135 determines that "the change in channel responses is monotonous during the time from the symbol index $s=l_p-4$ to $s=l_p+4$". Likewise, when the channel responses as shown in FIG. 6 are obtained, the channel response determination portion 135 determines that "the change in channel responses is not monotonous during the time from the symbol index $s=l_p-4$ to $s=l_p+4$".

To determine in which state out of the above two states the change in channel responses is, the channel response determination portion 135 determines a change amount dH1 in channel response observed when the symbol index s shifts from $s=l_p-4$ to $s=l_p$ and a change amount dH2 in channel response observed when the symbol index s shifts from $s=l_p$ to $s=l_p+4$, to determine the state according to the change amounts dH1 and dH2. The extent of the change in channel responses may be determined further in detail to enable determination in which state among three or more states the change in channel responses is. Since channel responses are represented by complex vectors, the value of the difference between vectors of channel responses or a squared value thereof may be selected as the value of the change amount dH1 or dH2.

The operator 134 computes channel responses for pilot signal-inserted carriers by using both linear extrapolation and linear interpolation, as in Embodiment 1, by appropriately selecting and reading the channel responses from the channel response calculation section 22 and the memory 131 according to the operation patterns as shown in FIGS. 9 and 10, and further executing linear operation of the expression (8) or (10), for example, for the selected channel responses according to the chart of FIG. 11.

During the above operation, the operator 134 computes each channel response by controlling the proportion of contribution of the linear-extrapolated channel response based on the channel change information output from the channel response determination portion 135. The operator 134 controls to reduce the proportion of contribution of the linear-extrapolated channel response when the channel responses for pilot signals greatly change, because it is considered that the channel response obtained by linear extrapolation (prediction) may include many errors. In reverse, the operator 134 controls to increase the proportion of contribution of the linear-extrapolated channel response when the channel responses do not greatly change.

In the case that the channel response determination portion 135 outputs two-stage channel change information that "the change in channel responses is not monotonous" and "the change in channel responses is monotonous", the operator 134 prepares two sets of coefficients $(u_{1v}, u_{2v}, u_{3v})$ and $(u_{1w}, u_{2w}, u_{3w})$ $(u_{1v} \leq u_{1w}, u_{2v} \leq u_{2w}, u_{3v} \leq u_{3w})$, for example, and appropriately selects and uses one of these sets of coefficients, not using one fixed set of coefficients $(u_1, u_2, u_3)$.

Specifically, the set of coefficients $(u_{1v}, u_{2v}, u_{3v})$ may be used when the change in channel responses is not monotonous (case as shown in FIG. 6), and the set of coefficients $(u_{1w}, u_{2w}, u_{3w})$ may be used when the change in channel response is monotonous (case as shown in FIG. 14). Alternatively, depending on the state of the channel, the channel responses may be determined by controlling the coefficients so as to use only linear interpolation (or linear extrapolation), not using both linear interpolation and linear extrapolation.

In the case that the channel response determination portion 135 outputs channel change information to permit discrimination among three or more different states of the channel, more sets of coefficients should be prepared for use in the operation of channel responses, to thereby enable more flexible response to the change in channel responses.

A generalized case that pilot signals are inserted every N symbols and the channel response determination portion 135 outputs channel change information to permit discrimination among C (C is an integer equal to or more than 2) different states of the channel will be described. In this case, the operator 134 prepares in advance C sets of coefficients each having N−1 coefficients $u_{v,m}$, that is, $$(u_{1,1}, u_{1,2}, \ldots, u_{1,m}, \ldots, u_{1,N-1}), (u_{2,1}, u_{2,2}, \ldots, u_{2,m}, \ldots, u_{2,N-1}), \ldots, (u_{v,1}, u_{v,2}, \ldots, u_{v,m}, \ldots, u_{v,N-1}), \ldots, (u_{C,1}, u_{C,2}, \ldots, u_{C,m}, \ldots, u_{C,N-1})$$

($u_{v,m}$ is a real number satisfying $u_{v,1} \neq 0$, $u_{1,m} \geq u_{2,m} \geq \ldots \geq u_{v,m} \geq \ldots \geq u_{C,m}$, and v is an integer satisfying $1 \leq v \leq C$), and selects one set among these C sets of coefficients according to the channel change information.

In relation to the above, the coefficient $u_{v,m}$ is desirably set at a smaller value as the relevant symbol is closer to the timing of the third pilot signal, that is, set to satisfy $u_{v,1} \geq u_{v,2} \geq \ldots \geq u_{v,m} \geq \ldots \geq u_{v,N-1}$, so that the ratio of $u_{v,m}$ to $1-u_{v,m}$ is smaller as the relevant symbol is closer to the timing of the third pilot signal. Using the selected set of coefficients, the operation of the expression (8) or (10) is executed as $u_m = u_{v,m}$, to determine channel responses.

As described above, the time axis interpolation section 130 of FIG. 13 controls the ratio of the linear-extrapolated channel response to the linear-interpolated channel response according to the extent of the change in channel responses for pilot signals, in the linear operation of the expression (8) or (10). In this way, since the linear-extrapolated channel response component can be changed according to the change state of the channel responses in calculation of a channel response, the estimation error of the channel response can be reduced.

Second Alteration to Embodiment 1

In this alteration, described will be the case of controlling the proportion of contribution of the linear-extrapolated channel response according to the extent of the influence of interference due to fading, in determination of a channel response using both linear extrapolation and linear interpolation.

Figure 15:
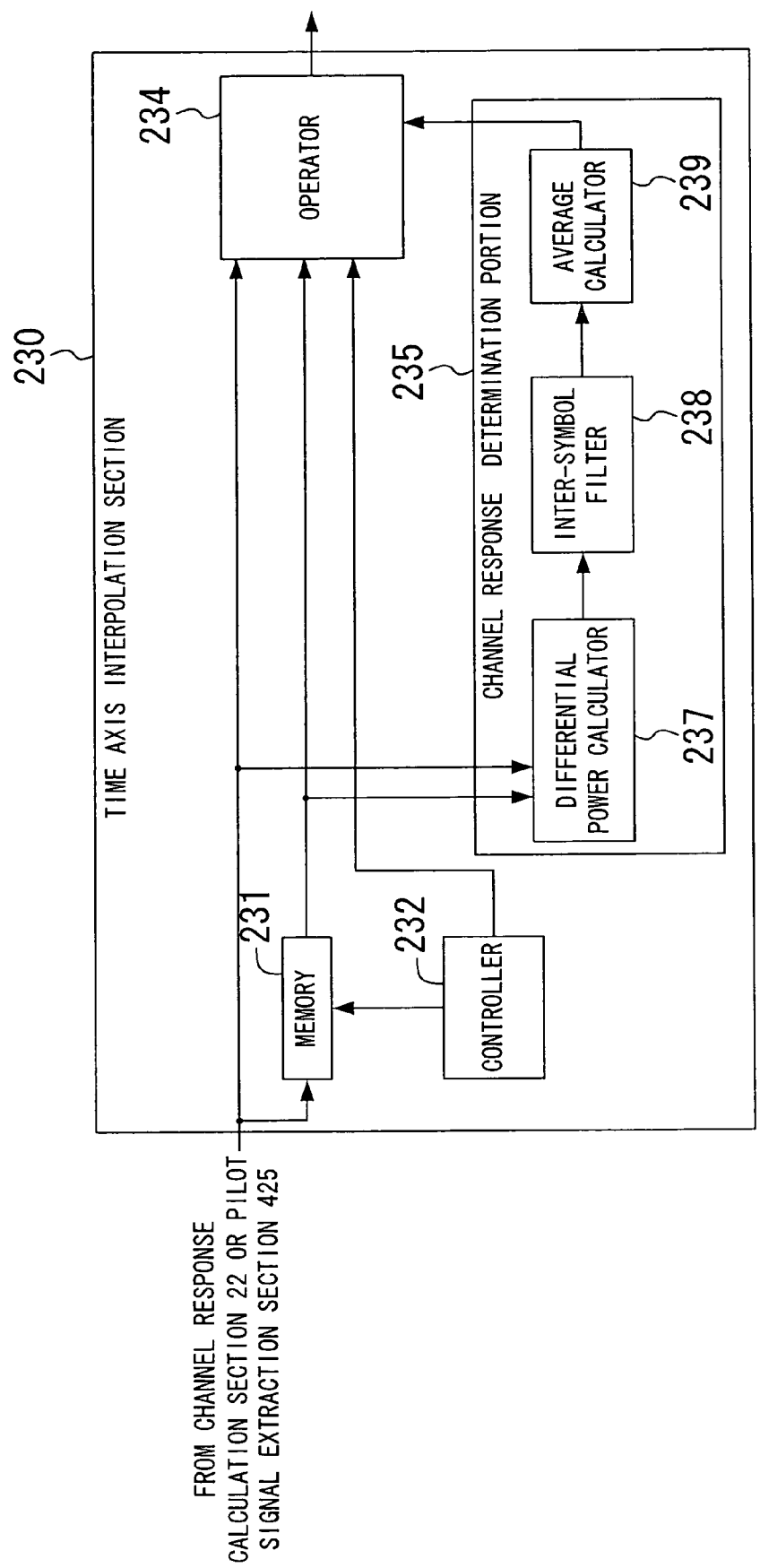
FIG. 15 is a block diagram showing a configuration of a time axis interpolation section of a reception apparatus of a second alteration to Embodiment 1.

FIG. 15 is a block diagram showing a configuration of a time axis interpolation section 230 of a reception apparatus of the second alteration to Embodiment 1. The reception apparatus of this alteration is different from the reception apparatus of FIG. 1 in that the time axis interpolation section 230 is provided in place of the time axis interpolation section 30 in FIG. 1. The time axis interpolation section 230 includes a channel response determination portion 235 in place of the channel response determination portion 135 in the time axis interpolation section 130 of FIG. 13. The time axis interpolation section 230 includes a memory 231, a controller 232, an operator 234 and the channel response determination portion 235. The channel response determination portion 235 includes a differential power calculator 237, an inter-symbol filter 238, and an average calculator 239. The memory 231 and the controller 232 respectively correspond to the memory 131 and the controller 132 in FIG. 13.

Referring to FIG. 15, the differential power calculator 237 determines a difference between channel responses for pilot signals output from the channel response calculation section 22 and the memory 231, squares the resultant difference value to obtain a differential power, and outputs the results to the inter-symbol filter 238. At this time, the controller 232 controls the memory 231 to output a channel response for a pilot signal immediately preceding a pilot signal corresponding to the channel response output from the channel response calculation section 22. The differential power output from the differential power calculator 237 corresponds to a change amount in the channel responses for pilot signals in one cycle (N symbols).

The inter-symbol filter 238 calculates a change amount in channel responses by integrating the differential power for each pilot signal-inserted carrier, and outputs the results to the average calculator 239.

The average calculator 239 averages the change amounts in channel responses obtained for the respective pilot signal-inserted carriers, and output the calculated average value to the operator 234 as fading information. The fading information refers to an average change amount in channel responses for all the pilot signals, indicating the degree of fading interference. When heavy fading interference occurs, the channel responses change greatly, and as a result, the fading information gives a comparatively large value.

The operator 234 performs the same operation as the operator 134 in FIG. 13, except that the proportion of contribution of the linear-extrapolated channel response is controlled based on the fading information output from the channel response determination portion 235 in calculation of the channel responses.

Specifically, the operator 234 prepares a plurality of sets of three coefficients, for example, and executes the operation of the expression (8) or (10) using one set appropriately selected from these sets of coefficients according to the fading information value output from the average calculator 239, to determine the channel responses.

When channel responses for pilot signals greatly change and thus the fading information value is large, it is considered that the linear-extrapolated channel response may include many errors. In view of this, the operator 234 controls to reduce the proportion of contribution of the linear-extrapolated channel response when the fading information value is large and, in reverse, increase the proportion of contribution of the linear-extrapolated channel response when the fading information value is small.

Alternatively, the time axis interpolation section 230 may be controlled, not to always use the results obtained by using both linear extrapolation and linear interpolation, but to select the results obtained by using either linear interpolation, linear extrapolation, the arithmetic mean of channel responses for the first to third pilot signals, or the combination of linear interpolation and linear extrapolation, according to the state of the channel.

As described above, in estimation of channel responses from the received signal, the time axis interpolation section 230 of FIG. 15 can calculate the channel responses according to the degree of the influence of fading interference. Therefore, the estimation error of the channel responses can be reduced even when the received signal is influenced with fading interference.

Third Alteration to Embodiment 1

In this alteration, described will be the case of controlling the proportion of contribution of the linear-extrapolated channel response according to the noise power in the received signal or the C/N ratio (ratio of carrier power to noise power), in determination of channel responses using both linear extrapolation and linear interpolation.

Figure 16:
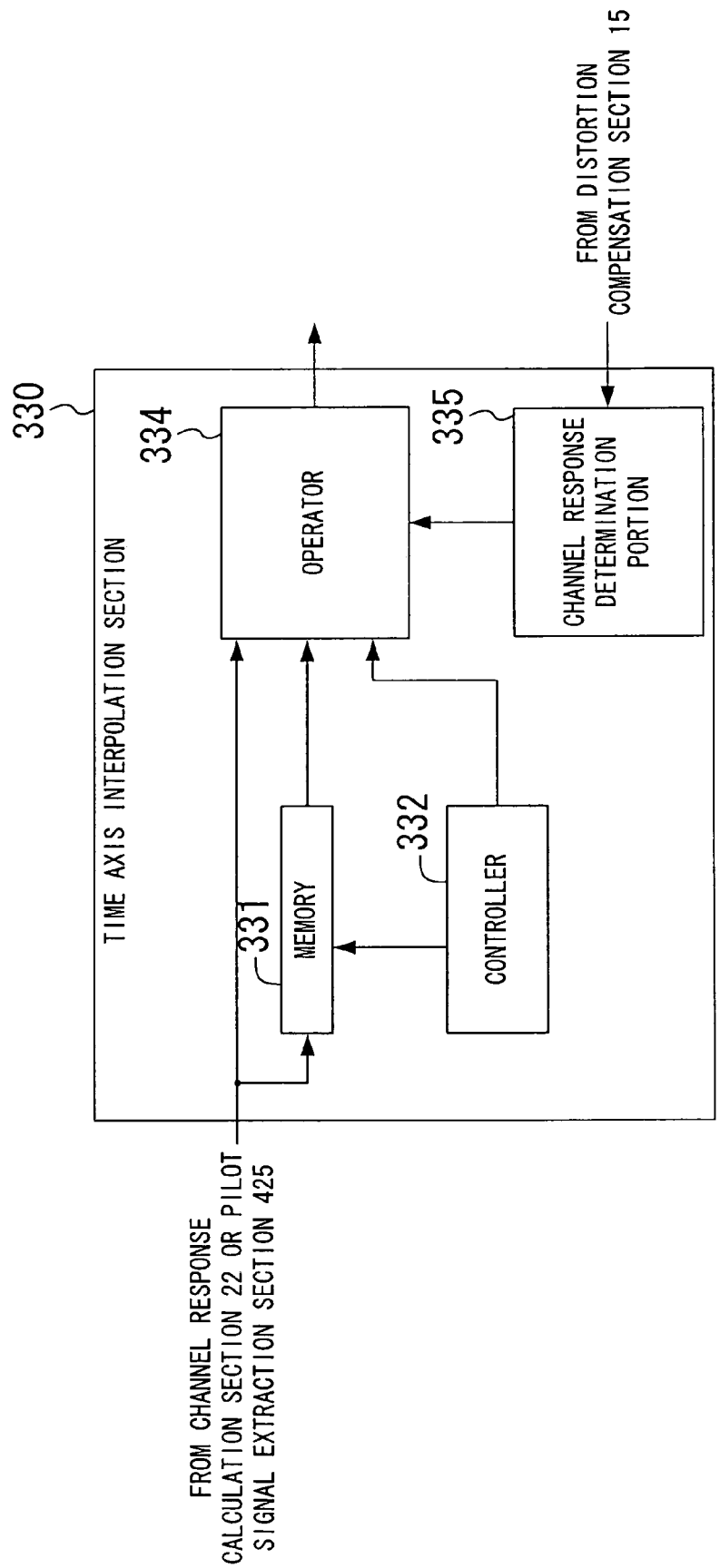
FIG. 16 is a block diagram showing a configuration of a time axis interpolation section of a reception apparatus of a third alteration to Embodiment 1.

FIG. 16 is a block diagram showing a configuration of a time axis interpolation section 330 of a reception apparatus of the third alteration to Embodiment 1. The reception apparatus of this alteration is different from the reception apparatus of FIG. 1 in that the time axis interpolation section 330 is provided in place of the time axis interpolation section 30 in FIG. 1. The time axis interpolation section 330 includes a channel response determination portion 335 in place of the channel response determination portion 135 in the time axis interpolation section 130 of FIG. 13. The time axis interpolation section 330 includes a memory 331, a controller 332, an operator 334 and the channel response determination portion 335. The memory 331 and the controller 332 respectively correspond to the memory 131 and the controller 132 in FIG. 13.

Figure 17:
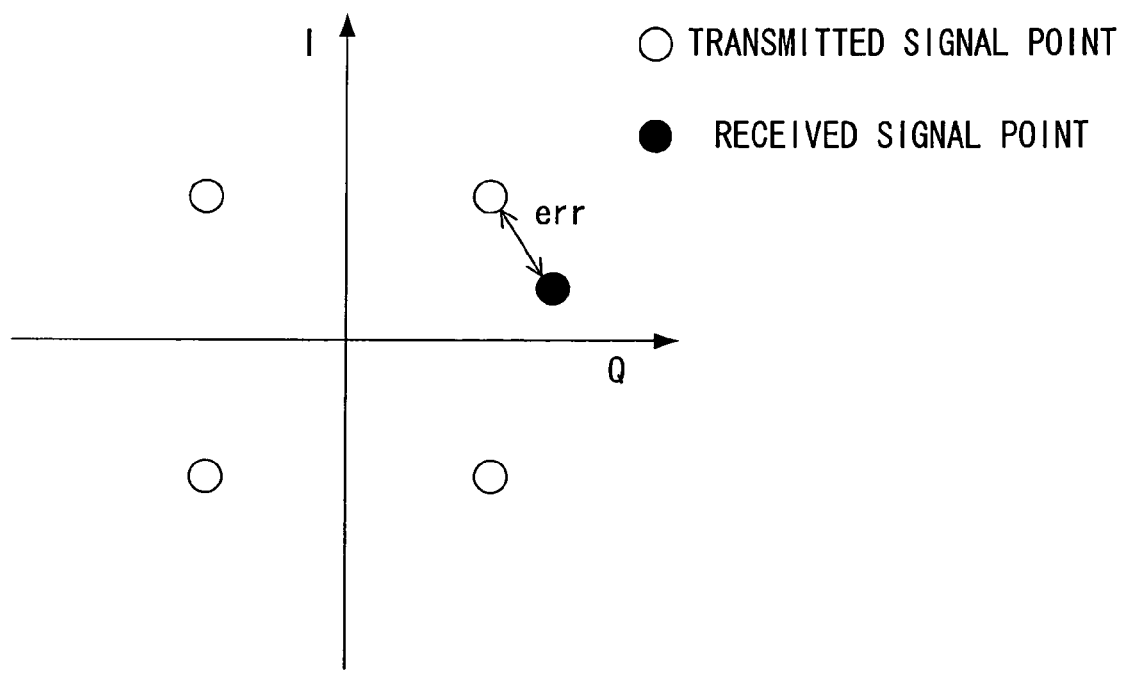
FIG. 17 is a view showing an example of signal constellation.

FIG. 17 is a view showing an example of signal constellation. In FIG. 16, the channel response determination portion 335 hard-decides the equalized signal output from the distortion compensation section 15 to determine a transmitted signal point, and determines noise power of the received signal from the square of a signal point distance err between the transmitted signal point and a signal point of the equalized received signal (see FIG. 17). The channel response determination portion 335 outputs the determined noise power value to the operator 334 as noise information.

The operator 334 performs the same operation as the operator 134 in FIG. 13, except for calculating channel responses by controlling the proportion of contribution of the linear-extrapolated channel response based on the noise information output from the channel response determination portion 335.

Specifically, the operator 334 prepares a plurality of sets of three coefficients, for example, and executes the operation of the expression (8) or (10) using one set appropriately selected from these sets of coefficients according to the noise information value output from the channel response determination portion 335, to determine the channel responses.

In general, linear-interpolated channel responses are less influenced by the noise power compared with linear-extrapolated channel responses. In other words, when the noise power is large, it is considered that the linear-extrapolated channel response may include many errors. In view of this, the operator 334 controls to reduce the proportion of contribution of the linear-extrapolated channel response when the noise information value is large and, in reverse, increase the proportion of contribution of the linear-extrapolated channel response when the noise information value is small.

Alternatively, depending on the state of the channel, the coefficients may be controlled so that only linear interpolation (or only linear extrapolation), not both linear interpolation and linear extrapolation, is used to determine channel responses.

As described above, in estimation of channel responses from the received signal, the time axis interpolation section 330 of FIG. 16 can calculate the channel responses according to the degree of noise. Therefore, the estimation error of the channel responses can be reduced even when noise is included in the received signal.

A value closely correlated with the noise power may be determined to substitute for the noise power. For example, in place of the noise power, the C/N ratio as the ratio of carrier power to noise power may be determined and used. Otherwise, a value closely correlated with the C/N ratio may be determined to substitute for the C/N ratio.

As described above, in the alterations to Embodiment 1, the channel response is determined, and the proportion of contribution between the linear-extrapolated channel response and the linear interpolated channel response is changed depending on the determination results, in determination of the channel responses for data signals. Therefore, channel responses for data signals can be estimated with a small error even in the reception environment in which the channel responses change vigorously due to the influence of fading and the like.

EMBODIMENT 2

In Embodiment 1, the reception apparatuses shown in FIG. 1 and other drawings first execute an operation for the output of the FFT section 14 with known pilot signals to determine channel responses for pilot signals included in a received signal, and then perform time axis interpolation for the results. The order of the determination of channel responses with known pilot signals and the like and the time axis interpolation may be reversed. This reverse order is applicable in the case of receiving a transmitted signal in which pilot signals are inserted so that the amplitude and phase of the pilot signals are constant in all pilot signal-inserted carriers, like the case in the terrestrial digital TV broadcasting system in Japan, the European terrestrial digital TV broadcasting system (DVB-T) and the like. In this embodiment, described is a reception apparatus that first performs time axis interpolation with pilot signals obtained from a received signal and then determines channel responses by executing division with known pilot signals.

Figure 18:
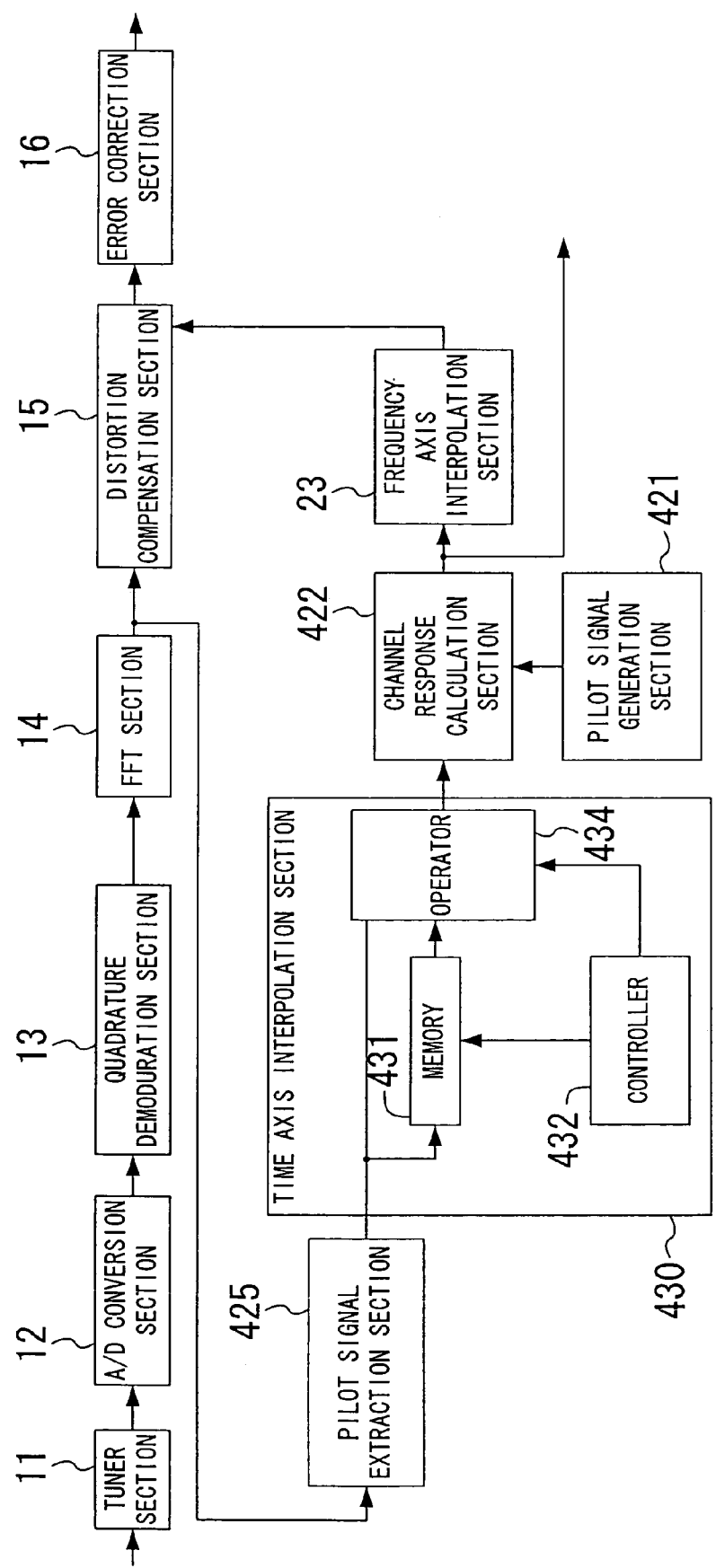
FIG. 18 is a block diagram showing a configuration of a reception apparatus of Embodiment 2 of the present invention.

FIG. 18 is a block diagram showing a configuration of the reception apparatus of Embodiment 2 of the present invention. The reception apparatus of FIG. 18 includes a tuner section 11, an A/D conversion section 12, a quadrature demodulation section 13, a FFT section 14, a distortion compensation section 15, an error correction section 16, a pilot signal generation section 421, a channel response calculation section 422, a frequency axis interpolation section 23, a pilot signal extraction section 425 and a time axis interpolation section 430. The time axis interpolation section 430 includes a memory 431, a controller 432 and an operator 434. The memory 431 and the controller 432 respectively correspond to the memory 31 and the controller 32 shown in FIG. 1. The same components as those described with reference to FIG. 1 are denoted by the same reference numerals, and the description thereof is omitted here. Assume that the reception apparatus of FIG. 18 receives an OFDM signal like that described in Embodiment 1.

The FFT section 14 performs fast Fourier transform to transform the baseband OFDM signal in the time domain to an OFDM signal in the frequency domain, and outputs the resultant signal to the distortion compensation section 15 and the pilot signal extraction section 425.

The output of the FFT section 14 gives the phase and amplitude of each of a plurality of carriers included in the OFDM signal, and is specifically handled in the form of a complex signal having an I axis component and a Q axis component independently. Predetermined carriers among the plurality of carriers (for example, one every three carriers) have pilot signals inserted at predetermined timings (for example, every four symbols).

The pilot extraction section 425 extracts pilot signals inserted in the predetermined carriers from the signal output from the FFT section 14, and outputs the results to the time axis interpolation section 430. Each extracted pilot signal is in the form of a complex signal having an I axis component and a Q axis component independently.

While the time axis interpolation section 30 in FIG. 1 performed time axis interpolation with the channel responses $H(l_p, k_p)$ for pilot signals, the time axis interpolation section 430 in FIG. 18 performs time axis interpolation with the pilot signals $P(l_p, k_p)$ themselves.

The time axis interpolation section 430 performs interpolation in the symbol direction (along the time axis) (see the arrows in FIG. 3) for pilot signal-inserted carriers-based on three pilot signals transmitted at predetermined symbol intervals, to determine interpolated signals $Pes(l_p+m, k_p)$ ($1 \leq m \leq N-1$) at timings of symbols free from transmission of pilot signals, and outputs the results to the channel response calculation section 422.

In other words, the time axis interpolation section 430 determines interpolated signals for symbols between the time point of the second pilot signal and the time point of the third pilot signal (interpolated signals at timings of data signals) based on the first, second and third pilot signals, and outputs the results to the channel response calculation section 422. Note that the three pilot signals are called the first, second and third pilot signals in the descending order of the time at which each signal is transmitted. The intervals between the pilot signals may be equal to or different from one another. The first to third pilot signals may be adjacent to one another, or another pilot signal may exist between any two of the first to third pilot signals.

The pilot signal generation section 421 generates pilot signals having a known amplitude and phase at the timings of symbols, and outputs the results to the channel response calculation section 422. The channel response calculation section 422 estimates channel responses for symbols of pilot signal-inserted carriers by executing division of the output of the time axis interpolation section 430 by the known pilot signals generated by the pilot signal generation section 421, and outputs the results to the frequency axis interpolation section 23.

The time axis interpolation section 430 is the same in configuration and others as the time axis interpolation section 30, except for receiving, not channel responses for pilot signals, but the pilot signals themselves. Therefore, the time axis interpolation section 430 determines an interpolated signal Pes according to the expression, $$Pes(l_p+m, k_p) = u_m \cdot Pa(l_p+m, k_p) + (1-u_m) \cdot Pb(l_p+m, k_p) \qquad (21)$$

(m is an integer satisfying $1 \leq m \leq N-1$, and $u_m$ is a real number satisfying $u_1 \neq 0$ and $u_1 \geq u_2 \geq \ldots \geq u_m \geq \ldots \geq u_{N-1}$), in place of the expression (8).

In the above expression, the interpolated signal $Pa(l_p+m, k_p)$ refers to an interpolated signal obtained for a data signal between symbol indexes $s=l_p$ and $s=l_p+N$ by linear extrapolation based on pilot signals $P(l_p-N, k_p)$ and $P(l_p, k_p)$. The interpolated signal $Pb(l_p+m, k_p)$ refers to an interpolated signal obtained for a data signal between the symbol indexes $s=l_p$ and $s=l_p+N$ by linear interpolation based on pilot signals $P(l_p, k_p)$ and $P(l_p+N, k_p)$.

The time axis interpolation section 430 may also determine the interpolated signal Pes according to the expressions $$Pes(l_p+1, k_p) = (-u_1/4) \cdot P(l_p-4, k_p) + \quad (22a)$$
$$\{(3+2 \cdot u_1)/4\} \cdot P(l_p, k_p) + \{(1-u_1)/4\} \cdot P(l_p+4, k_p)$$

$$Pes(l_p+2, k_p) = (-u_2/2) \cdot P(l_p-4, k_p) + \quad (22b)$$
$$\{(1+2 \cdot u_2)/2\} \cdot P(l_p, k_p) + \{(1-u_2)/2\} \cdot P(l_p+4, k_p)$$

$$Pes(l_p+3, k_p) = (-3 \cdot u_3/4) \cdot P(l_p-4, k_p) + \quad (22c)$$
$$\{(1+6 \cdot u_3)/4\} \cdot P(l_p, k_p) + \{3 \cdot (1-u_3)/4\} \cdot P(l_p+4, k_p)$$

The expressions (22a) to (22c) can be put together and generalized based on the expression (21) into the following expression.

$$Pes(l_p+m, k_p) = \quad (23)$$
$$-(u_m \cdot m/N) \cdot P(l_p-N, k_p) + \{(2 \cdot u_m \cdot m + N - m)/N\} \cdot P(l_p, k_p) +$$
$$\{(1-u_m) \cdot m/N\} \cdot P(l_p+N, k_p)$$

($u_m$ is a real number satisfying $u_1 \neq 0$ and $u_1 \geq u_2 \geq \ldots \geq u_m \geq \ldots \geq u_{N-1}$, and m is an integer satisfying $1 \leq m \leq N-1$)

The operation and the like of the time axis interpolation section 430 are substantially the same as those described with reference to FIGS. 7 to 11, and thus detailed description thereof is omitted here.

The reception apparatus of FIG. 18 determines interpolated signals at timings of data signals based on the pilot signals themselves, in place of determining channel responses corresponding to data signals based on channel responses corresponding to pilot signals. The interpolation along the time axis is substantially the same as that described in Embodiment 1. In particular, the reception apparatus of FIG. 18 may use any of the time axis interpolation sections 130, 230 and 330 of FIGS. 13, 15 and 16, respectively, in place of the time axis interpolation section 430.

EMBODIMENT 3

Figure 19:
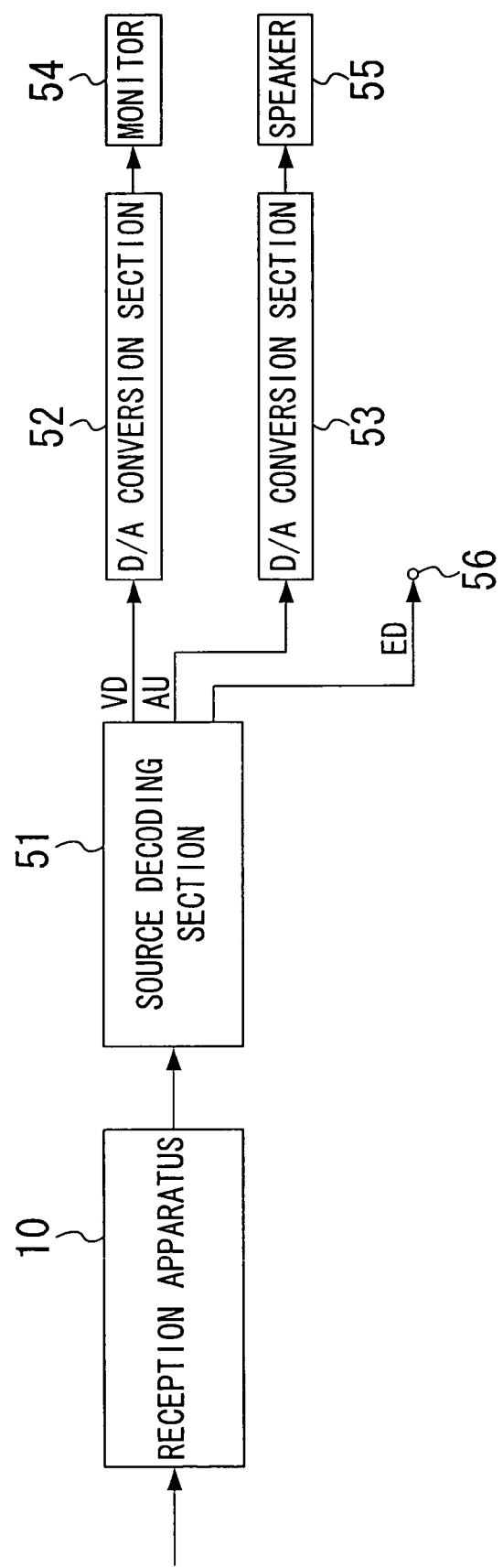
FIG. 19 is a block diagram showing a configuration of a reception apparatus of Embodiment 3 of the present invention.
Figure 20:
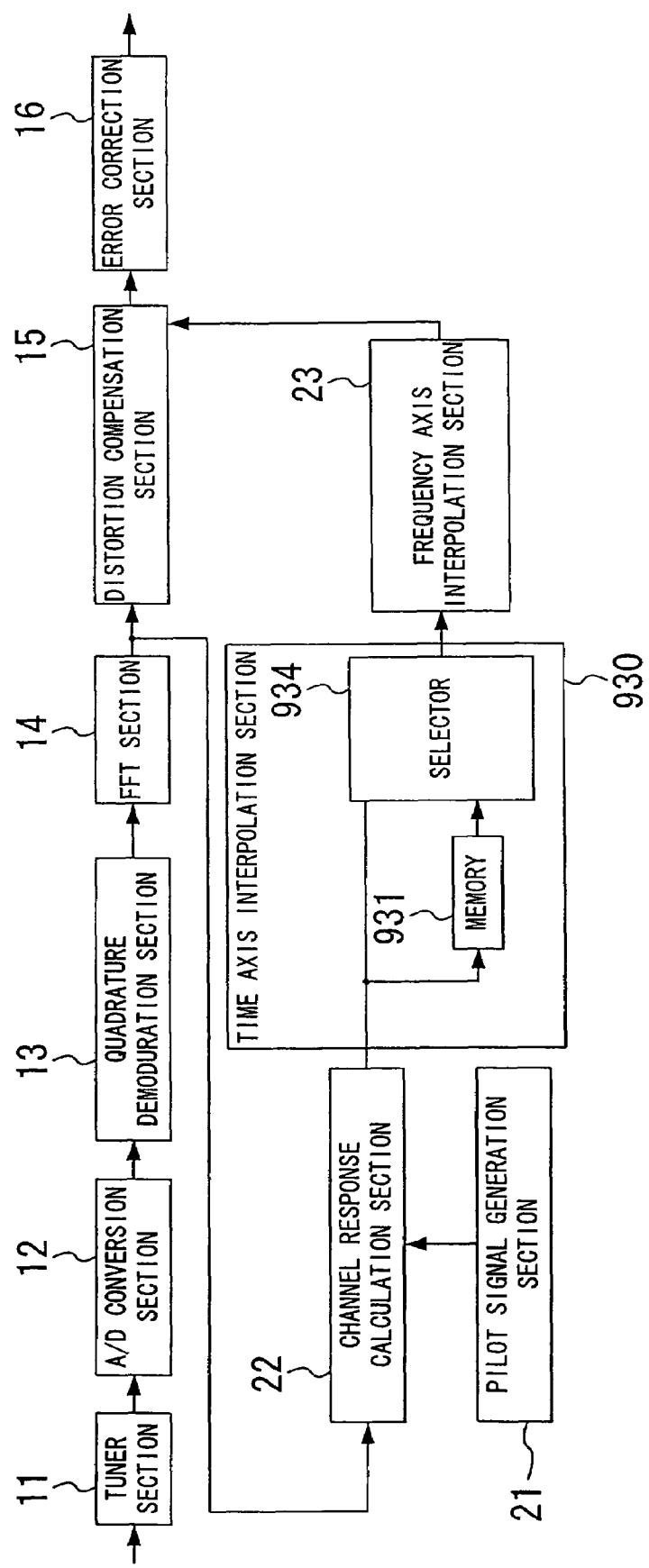
FIG. 20 is a block diagram showing a configuration of a conventional reception apparatus.
Figure 21:
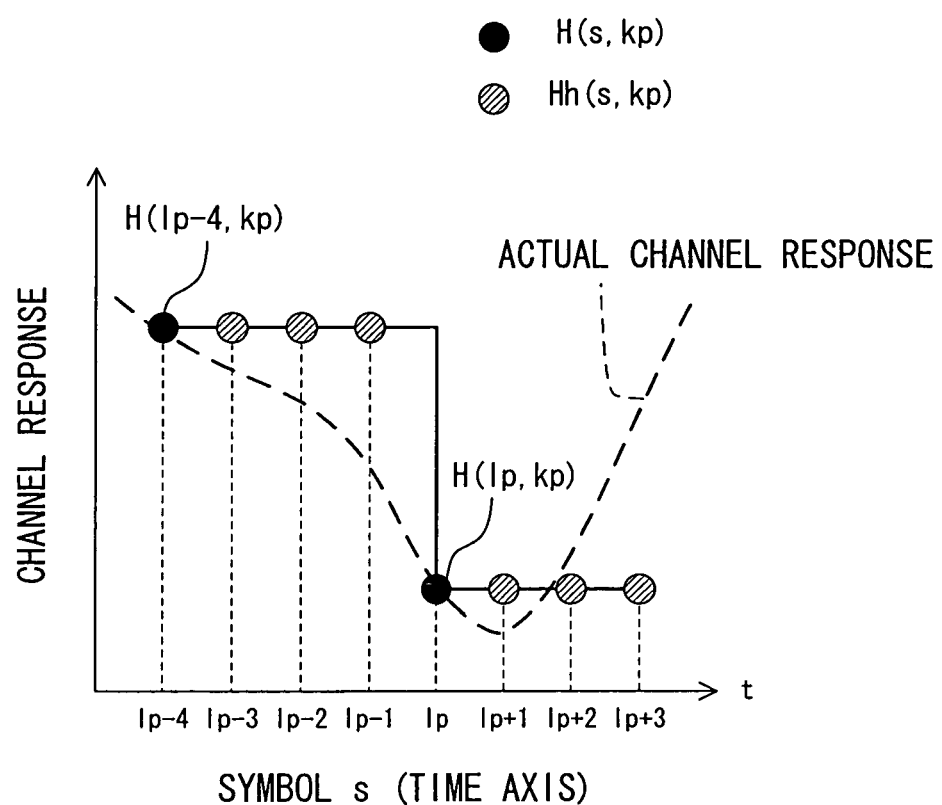
FIG. 21 is a view illustrating an example of channel responses obtained by zero-order interpolation.
Figure 22:
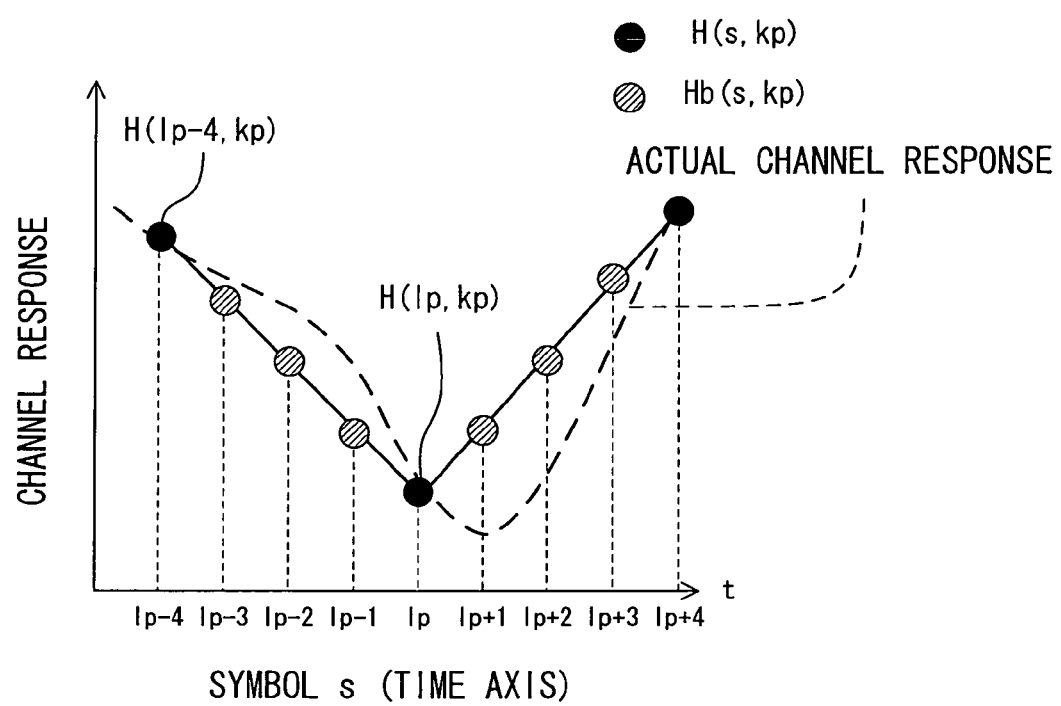
FIG. 22 is a view illustrating an example of channel responses obtained by linear interpolation.
Figure 23:
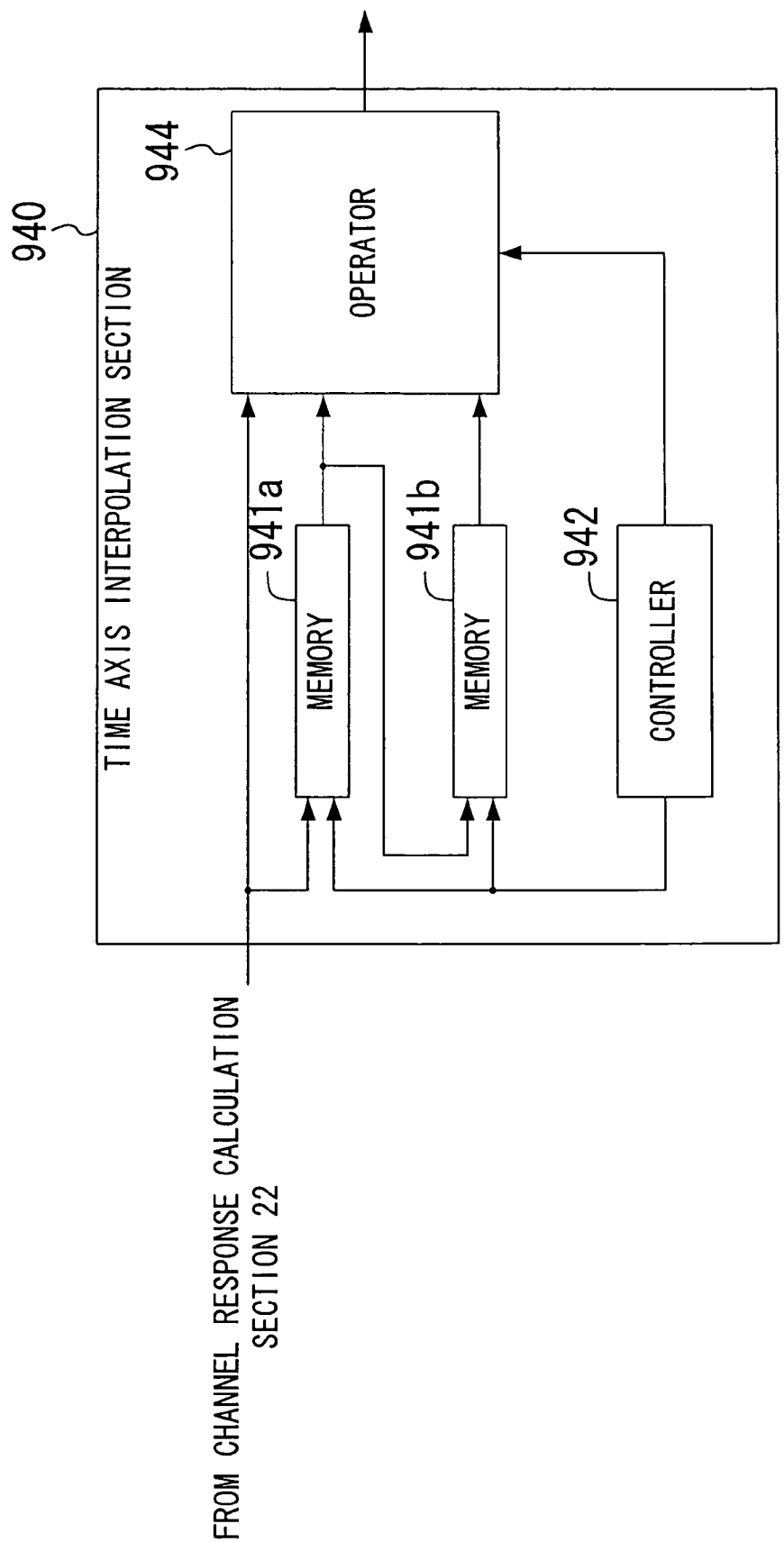
FIG. 23 is a block diagram showing another configuration of the time axis interpolation section of the conventional reception apparatus.
Figure 24:
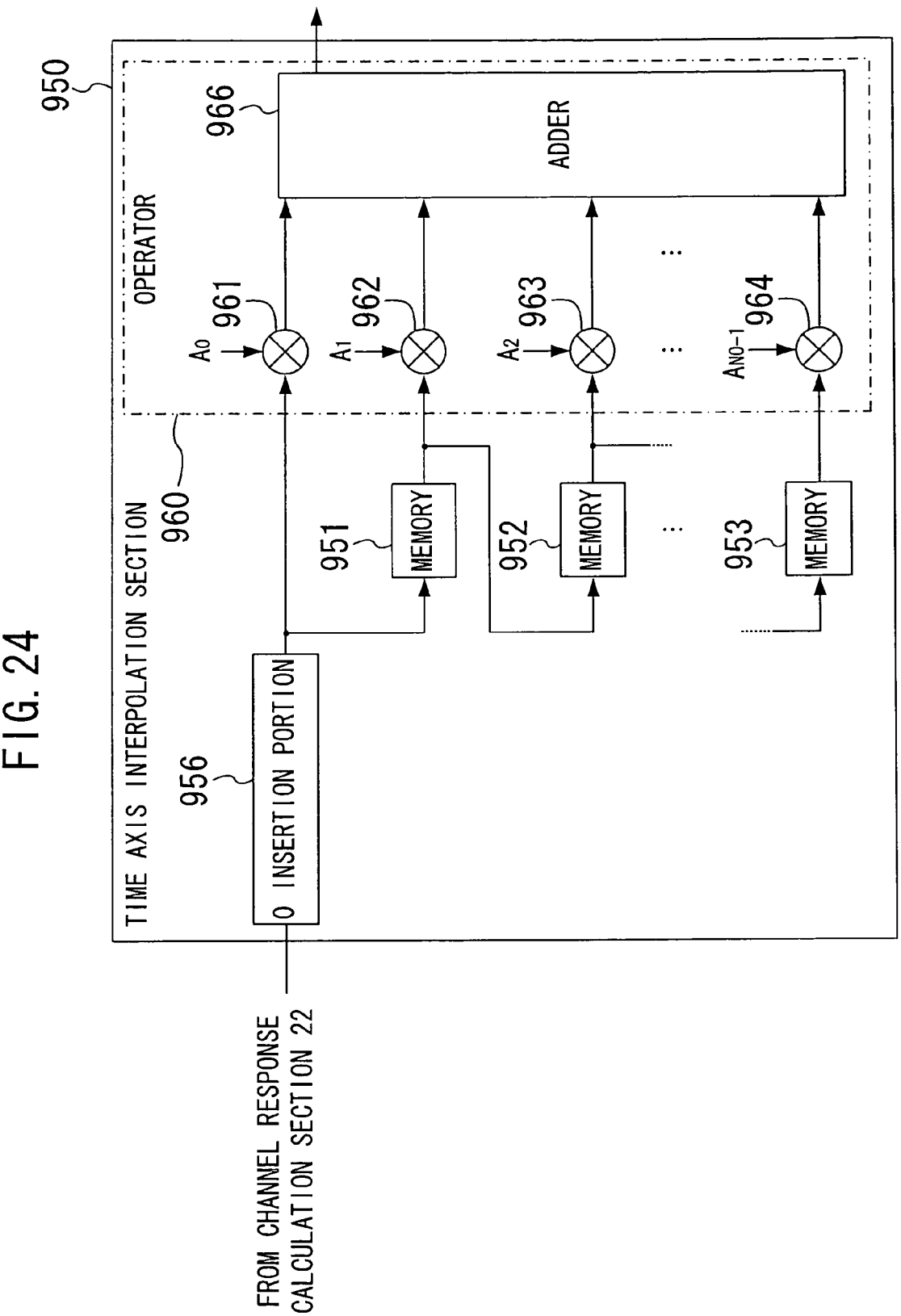
FIG. 24 is a block diagram showing a configuration of a time axis interpolation section that performs time axis interpolation using a FIR filter.

FIG. 19 is a block diagram showing a configuration of a reception apparatus of Embodiment 3 of the present invention. The reception apparatus of FIG. 19 includes the reception apparatus 10 of FIG. 1, a source decoding section 51, D/A conversion sections 52 and 53, a monitor 54 and a speaker 55.

The error correction section 16 of the reception apparatus 10 outputs a bit stream containing a video signal, an audio signal and other data. The video signal is in the compression-coded state by the moving picture experts group (MPEG) system, for example. The source decoding section 51 separates the output of the error correction section 16 into the video signal, the audio signal and the other data, and decodes these signals and data as required. The source decoding section 51 outputs the decoded video signal VD and audio signal AU to the corresponding D/A conversion sections 52 and 53, and outputs the other data ED to an output terminal 56.

The D/A conversion sections 52 and 53 convert the input signals to analog signals, and output the results to the monitor 54 and the speaker 55, respectively. The monitor 54 displays an image corresponding to the received signal, and the speaker 55 outputs sound corresponding to the input signal.

As described above, the reception apparatus of FIG. 19 can reproduce an image, sound and other data transmitted via the OFDM signal.

In place of the reception apparatus 10 of FIG. 1, the reception apparatus of FIG. 18 may be used. In place of the time axis interpolation section 30 in FIG. 1 or the time axis interpolation section 430 in FIG. 18, any of the time axis interpolation sections 130, 230 and 330 of FIGS. 13, 15 and 16, respectively, may be used.

In the above description, the reception apparatus of this embodiment includes the monitor 54, the speaker 55 and the output terminal 56. Alternatively, only one or two of these components may be provided.

In the above embodiments, the channel responses were described as if they were scalars for convenience of description. The channel responses can also be described in entirely the same manner even when they are considered as complex vectors. In the case that the channel responses are considered as complex vectors, they may be broken down into an I axis component and a Q axis component and these components may be handled as independent scalars, or otherwise the channel responses may be handled as complex vectors as they are.

In the above description, the Fourier transform section (FFT section) was described as performing FFT. Alternatively, the Fourier transform section may perform discrete Fourier transform (DFT).

The time axis interpolation section was described as including the memory, the controller and the operator. This configuration is merely an example for description, and any other configuration may be used as long as it permits similar processing.

In the above description, the OFDM signal included a plurality of carriers. Alternatively, a single-carrier signal may be received as long as the signal is configured to enable estimation of channel responses using pilot signals.

The present invention is also applicable to measuring instruments that require neither equalization nor decoding for the received signal. In this case, a configuration excluding the distortion compensation section 15 and the error correction section 16 from the configuration of FIG. 1 or the like may be used as a channel response measurement apparatus, in which the channel responses output from the time axis interpolation section 30 in FIG. 1 or the channel responses output from the channel response calculation section 422 in FIG. 18 are the output of the channel response measurement apparatus. In such a channel response measurement apparatus, any of the time axis interpolation sections 130, 230 and 330 of FIGS. 13, 15 and 16, respectively, may be used in place of the time axis interpolation section 30 or 430. The output of the frequency axis interpolation section 23 in FIG. 1 or 18 may be used as the output of the channel response measurement apparatus.

The interpolation along the frequency axis may be unnecessary depending on the use of the reception apparatus. In view of this, the reception apparatuses shown in FIG. 1, FIG. 18 and other drawings may omit the frequency axis interpolation section 23.

Part or all of the processing performed by the reception apparatus and the channel response measurement apparatus may be implemented by a processor such as a digital signal processor (DSP).

The invention claimed is:

1. A reception apparatus for receiving an orthogonal frequency division multiplexing (OFDM) signal having a plurality of pilot carriers, the pilot carriers being carriers transmitting predetermined pilot signals at predetermined symbols, the reception apparatus comprising:
   a Fourier transform section for transforming the received OFDM signal to a frequency-domain OFDM signal;

a pilot signal generation section for generating and outputting the predetermined pilot signals as frequency-domain signals;

a channel response calculation section for determining and outputting channel responses corresponding to the transmitted pilot signals based on the frequency-domain OFDM signal and the output of the pilot signal generation section for each of the pilot carriers among a plurality of carriers constituting the frequency-domain OFDM signal;

a time axis interpolation section for determining and outputting, based on channel responses corresponding to first, second and third pilot signals transmitted sequentially in a same carrier, a channel response at a symbol between the second pilot signal and the third pilot signal; and a distortion compensation section for compensating a waveform distortion in the frequency-domain OFDM signal according to the channel response output from the time axis interpolation section.

2. The reception apparatus of claim 1, wherein the time axis interpolation section determines the sum of a product obtained by multiplying an extrapolated channel response by a first coefficient, the first coefficient being a value other than 0, and a product obtained by multiplying an interpolated channel response by a second coefficient, as the channel response at the symbol between the second pilot signal and the third pilot signal, for each of the pilot carriers, the extrapolated channel response is a channel response at the symbol between the second pilot signal and the third pilot signal obtained by linear extrapolation operation for the channel response corresponding to the first pilot signal and the channel response corresponding to the second pilot signal, and the interpolated channel response is a channel response at the symbol between the second pilot signal and the third pilot signal obtained by linear interpolation operation for the channel response corresponding to the second pilot signal and the channel response corresponding to the third pilot signal.

3. The reception apparatus of claim 2, further comprising a channel response determination section for determining and outputting channel information representing the state of a channel, wherein the time axis interpolation section changes the first coefficient and the second coefficient according to the channel information.

4. The reception apparatus of claim 3, wherein the channel response determination section determines and outputs the channel information based on a change amount of the channel response corresponding to the second pilot signal from the channel response corresponding to the first pilot signal and a change amount of the channel response corresponding to the third pilot signal from the channel response corresponding to the second pilot signal.

5. The reception apparatus of claim 3, wherein the channel response determination section determines and outputs the degree of fading as the channel information based on the channel responses determined by the channel response calculation section.

6. The reception apparatus of claim 3, wherein the channel response determination section determines noise and outputs power as the channel information based on the waveform distortion-compensated OFDM signal.

7. The reception apparatus of claim 3, wherein the channel response determination section determines and outputs the ratio of carrier power to noise power as the channel information based on the waveform distortion-compensated OFDM signal.

8. The reception apparatus of claim 2, wherein the ratio of the first coefficient to the second coefficient is made smaller as a symbol at which the channel response is determined is closer to the timing of the third pilot signal.

9. The reception apparatus of claim 1, wherein, assuming that the OFDM signal has K (K is an integer equal to or more than 2) carriers, and that the first, second and third pilot signals of a carrier of a carrier index $k_p$ ($k_p$ is an integer indicating a carrier transmitting the pilot signals, satisfying $0 \leq k_p \leq K-1$) are transmitted at symbols of symbol indexes $l_p-N$, $l_p$ and $l_p+N$ ($l_p$ is an integer, and N is an integer equal to or more than 2), respectively, the time axis interpolation section outputs, as a channel response at a symbol of a symbol index $l_p+m$ (m is an integer satisfying $1 \leq m \leq N-1$) for the carrier of the carrier index $k_p$, the results obtained by executing linear operation for an extrapolated channel response $Ha(l_p+m, k_p)$ and an interpolated channel response $Hb(l_p+m, k_p)$ at this symbol, $$u_m \cdot Ha(l_p+m,k_p)+(1-u_m) \cdot Hb(l_p+m,k_p)$$

($u_m$ is a real number satisfying $u_1 \neq 0$ and $u_1 \geq u_2 \geq \ldots \geq u_m \geq \ldots \geq u_{N-1}$), the extrapolated channel response $Ha(l_p+m, k_p)$ is a channel response obtained by linear extrapolation operation for the channel response $H(l_p-N, k_p)$ corresponding to the first pilot signal and the channel response $H(l_p, k_p)$ corresponding to the second pilot signal, $$Ha(l_p+m,k_p)=H(l_p,k_p)+(m/N) \cdot \{H(l_p,k_p)-H(l_p-N,k_p)\},$$
and the interpolated channel response $Hb(l_p+m, k_p)$ is a channel response obtained by linear interpolation operation for the channel response $H(l_p, k_p)$ corresponding to the second pilot signal and the channel response $H(l_p+N, k_p)$ corresponding to the third pilot signal, $$Hb(l_p+m,k_p)=(N-m)/N \cdot H(l_p,k_p)+m/N \cdot H(l_p+N,k_p).$$

10. The reception apparatus of claim 1, wherein, assuming that the OFDM signal has K (K is an integer equal to or more than 2) carriers, and that the first, second and third pilot signals of a carrier of a carrier index $k_p$ ($k_p$ is an integer indicating a carrier transmitting the pilot signals, satisfying $0 \leq k_p \leq K-1$) are transmitted at symbols of symbol indexes $l_p-N$, $l_p$ and $l_p+N$ ($l_p$ is an integer, and N is an integer equal to or more than 2), the time axis interpolation section outputs, a channel response at a symbol of a symbol index $l_p+m$ (m is an integer satisfying $1 \leq m \leq N-1$) for the carrier of the carrier index $k_p$, the channel response obtained by executing linear operation for a skip linear-interpolated channel response $Hc(l_p+m, k_p)$ and an extrapolated channel response $Ha(l_p+m, k_p)$ at this symbol, $$u_m \cdot Hc(l_p+m,k_p)+(1-u_m) \cdot Ha(l_p+m,k_p)$$

($u_m$ n is a real number satisfying $|u_m|<1$), the skip linear-interpolated channel response $Hc(l_p+m, k_p)$ is a channel response obtained by linear interpolation operation for the channel response $H(l_p-N, k_p)$ corresponding to the first pilot signal and the channel response $H(l_p+N, k_p)$ corresponding to the third pilot signal, $$Hc(l_p + m, k_p) =$$
$$(N-m)/(2 \cdot N) \cdot H(l_p - N, k_p) + (N+m)/(2 \cdot N) \cdot H(l_p + N, k_p), \text{ and}$$

the extrapolated channel response $Ha(l_p+m, k_p)$ is a channel response obtained by linear extrapolation operation for the channel response $H(l_p-N, k_p)$ corresponding to the first pilot signal and the channel response $H(l_p, k_p)$ corresponding to the second pilot signal, $$Ha(l_p+m,k_p)=H(l_p,k_p)+(m/N)\cdot\{H(l_p,k_p)-H(l_p-N,k_p)\}.$$

11. The reception apparatus of claim 1, wherein, assuming that the OFDM signal has K (K is an integer equal to or more than 2) carriers, and that the first, second and third pilot signals of a carrier of a carrier index $k_p$ ($k_p$ is an integer indicating a carrier transmitting the pilot signals, satisfying $0 \leq k_p \leq K-1$) are transmitted at symbols of symbol indexes $l_p-N$, $l_p$ and $l_p+N$ ($l_p$ is an integer, and N is an integer equal to or more than 2), respectively, the time axis interpolation section output a channel response at a symbol of a symbol index $l_p+m$ (m is an integer satisfying $1 \leq m \leq N-1$) for the carrier of the carrier index $k_p$, the channel response obtained by executing linear operation for a skip linear-interpolated channel response $Hc(l_p+m, k_p)$ and an interpolated channel response $Hb(l_p+m, k_p)$ at this symbol, $$u_m \cdot Hc(l_p+m,k_p)+(1-u_m)\cdot Hb(l_p+m,k_p)$$

($u_m$ is a real number satisfying $|u_m|<1$), the skip linear-interpolated channel response $Hc(l_p+m, k_p)$ is a channel response obtained by linear interpolation operation for the channel response $H(l_p-N, k_p)$ corresponding to the first pilot signal and the channel response $H(l_p+N, k_p)$ corresponding to the third pilot signal, $$Hc(l_p + m, k_p) =$$
$$(N-m)/(2 \cdot N) \cdot H(l_p - N, k_p) + (N+m)/(2 \cdot N) \cdot H(l_p + N, k_p), \text{ and}$$

the interpolated channel response $Hb(l_p+m, k_p)$ is a channel response obtained by linear interpolation operation for the channel response $H(l_p, k_p)$ corresponding to the second pilot signal and the channel response $H(l_p+N, k_p)$ corresponding to the third pilot signal, $$Hb(l_p+m,k_p)=(N-m)/N \cdot H(l_p,k_p)+m/N \cdot H(l_p+N,k_p).$$

12. The reception apparatus of claim 1, wherein, assuming that the OFDM signal has K (K is an integer equal to or more than 2) carriers, and that the first, second and third pilot signals of a carrier of a carrier index $k_p$ ($k_p$ is an integer indicating a carrier transmitting the pilot signals, satisfying $0 \leq k_p \leq K-1$) are transmitted at symbols of symbol indexes $l_p-N$, $l_p$ and $l_p+N$ ($l_p$ is an integer, and N is an integer equal to or more than 2), respectively, the time axis interpolation section executes linear operation for the channel response $H(l_p-N, k_p)$ corresponding to the first pilot signal, the channel response $H(l_p, k_p)$ corresponding to the second pilot signal and the channel response $H(l_p+N, k_p)$ corresponding to the third pilot signal, $$-(u_m \cdot m/N) \cdot H(l_p - N, k_p) +$$
$$\{(2 \cdot u_m \cdot m + N - m)/N\} \cdot H(l_p, k_p) + \{(1-u_m)\cdot m/N\} \cdot H(l_p + N, k_p)$$

($u_m$ is a real number satisfying $u_1 \neq 0$ and $u_1 \geq u_2 \geq \ldots \geq u_m \geq \ldots > u_{N-1}$, and m is an integer satisfying $1 \leq m \leq N-1$), and determines a channel response at a symbol of a symbol index $l_p+m$ for the carrier of the carrier index $k_p$.

13. The reception apparatus of claim 1, wherein, assuming that the OFDM signal has K (K is an integer equal to or more than 2) carriers, and that the first, second and third pilot signals of a carrier of a carrier index $k_p$ ($k_p$ is an integer indicating a carrier transmitting the pilot signals, satisfying $0 \leq k_p \leq K-1$) are transmitted at symbols of symbol indexes $l_p-N$, $l_p$ and $l_p+N$ ($l_p$ is an integer, and N is an integer equal to or more than 2), respectively, the time axis interpolation section executes linear operation for the channel response $H(l_p-N, k_p)$ corresponding to the first pilot signal, the channel response $H(l_p, k_p)$ corresponding to the second pilot signal and the channel response $H(l_p+N, k_p)$ corresponding to the third pilot signal, $$\{u_m \cdot N + (u_m - 2) \cdot m\}/(2 \cdot N) \cdot H(l_p - N, k_p) +$$
$$(1-u_m)(N+m)/N \cdot H(l_p, k_p) + u_m \cdot (N+m)/(2 \cdot N) \cdot H(l_p + N, k_p)$$

($u_m$ is a real number satisfying $|u_m|<1$, and m is an integer satisfying $1 \leq m \leq N-1$), and determines a channel response at a symbol of a symbol index $l_p+m$ for the carrier of the carrier index $k_p$.

14. The reception apparatus of claim 1, wherein, assuming that the OFDM signal has K (K is an integer equal to or more than 2) carriers, and that the first, second and third pilot signals of a carrier of a carrier index $k_p$ ($k_p$ is an integer indicating a carrier transmitting the pilot signals, satisfying $0 \leq k_p \leq K-1$) are transmitted at symbols of symbol indexes $l_p-N$, $l_p$ and $l_p+N$ ($l_p$ is an integer, and N is an integer equal to or more than 2), respectively, the time axis interpolation section executes linear operation for the channel response $H(l_p-N, k_p)$ corresponding to the first pilot signal, the channel response $H(l_p, k_p)$ corresponding to the second pilot signal and the channel response $H(l_p+N, k_p)$ corresponding to the third pilot signal, $$u_m \cdot (N-m)/(2 \cdot N) \cdot H(l_p-N,k_p)+(1-u_m)(N-m)/N \cdot H(l_p, k_p)+\{u_m \cdot N+(2-u_m)\cdot m/(2 \cdot N)\}\cdot H(l_p+N,k_p)$$

($u_m$ is a real number satisfying $u_1 \neq 0$ and $|u_m|<1$, and m is an integer satisfying $1 \leq m \leq N-1$), and determines a channel response at a symbol of a symbol index $l_p+m$ for the carrier of the carrier index $k_p$.

15. The reception apparatus of any one of claims 9 to 14, further comprising a channel response determination section for determining and outputting channel information representing the state of a channel, wherein the time axis interpolation section selects one set from a plurality of sets of coefficients each having N−1 coefficients according to the channel information and uses the selected set of coefficients as the number $u_m$.

16. The reception apparatus of claim 15, wherein the channel response determination section determines and outputs the channel information based on a change amount of the channel response corresponding to the second pilot signal from the channel response corresponding to the first pilot signal and a change amount of the channel response corresponding to the third pilot signal from the channel response corresponding to the second pilot signal.

17. The reception apparatus of claim 15, wherein the channel response determination section determines and outputs the degree of influence of fading as the channel information based on the channel responses determined by the channel response calculation section.

18. The reception apparatus of claim 15, wherein the channel response determination section determines and outputs noise power as the channel information based on the waveform distortion-compensated OFDM signal.

19. The reception apparatus of claim 15, wherein the channel response determination section determines and outputs the ratio of carrier power to noise power as the channel information based on the waveform distortion-compensated OFDM signal.

20. A reception apparatus for receiving an orthogonal frequency division multiplexing (OFDM) signal having a plurality of pilot carriers, the pilot carriers being carriers transmitting predetermined pilot signals at predetermined symbols, the reception apparatus comprising:
   a Fourier transform section for transforming the received OFDM signal to a frequency-domain OFDM signal,
   a pilot signal generation section for generating and outputting the predetermined pilot signals as frequency-domain signals,
   a channel response calculation section for determining channel responses corresponding to the transmitted pilot signals for each of the pilot carriers among a plurality of carriers constituting the frequency-domain OFDM signal,
   a time axis interpolation section for determining and outputting, based on channel responses corresponding to first, second, third and fourth pilot signals transmitted sequentially in a same carrier, a channel response represented by a point on a cubic curve passing through points representing the channel responses corresponding to the first to fourth pilot signals by determining the points representing the channel responses corresponding to the first to fourth pilot signals on the plane representing channel responses with respect to symbols, dividing the determined four points into two sets each having two points, determining two straight lines each passing through the two points of each set, and executing linear operation for values of points on the two straight lines at a symbol of a same timing, and
   a distortion compensation section for compensating a waveform distortion in the frequency-domain OFDM signal according to the channel response output from the time axis interpolation section.

21. A reception apparatus for receiving a carrier transmitting predetermined pilot signals at predetermined symbols, the reception apparatus comprising:
   a pilot signal generation section for generating and outputting the predetermined pilot signals as frequency-domain signals,
   a channel response calculation section for determining channel responses corresponding to the respective transmitted pilot signals based on the received carrier and the output of the pilot signal generation section,
   a time axis interpolation section for determining and outputting, based on channel responses corresponding to first, second and third pilot signals transmitted sequentially in the carrier, a channel response at a symbol between the second pilot signal and the third pilot signal, and
   a distortion compensation section for compensating a waveform distortion in the received carrier according to the channel response at the symbol between the second pilot signal and the third pilot signal which is output from the time axis interpolation section.

22. A reception apparatus for receiving an orthogonal frequency division multiplexing (OFDM) signal having a plurality of pilot carriers, the pilot carriers being carriers transmitting predetermined pilot signals at predetermined symbols, the reception apparatus comprising:
   a tuner section for tuning the OFDM signal from a received signal and outputting the OFDM signal;
   a quadrature demodulation section for transforming the signal output from the tuner section to a baseband OFDM signal and outputting the baseband OFDM signal;
   a Fourier transform section for transforming the baseband OFDM signal output from the quadrature demodulation section to a frequency-domain OFDM signal and outputting the frequency-domain OFDM signal;
   a pilot signal generation section for generating and outputting the predetermined pilot signals as frequency-domain signals;
   a channel response calculation section for determining channel responses corresponding to the transmitted pilot signals based on the frequency-domain OFDM signal and the output of the pilot signal generation section for each of the pilot carriers among a plurality of carriers constituting the frequency-domain OFDM signal;
   a time axis interpolation section for determining and outputting, based on channel responses corresponding to first, second and third pilot signals transmitted sequentially in a same carrier, a channel response at a symbol between the second pilot signal and the third pilot signal;
   a distortion compensation section for compensating a waveform distortion in the frequency-domain OFDM signal according to the channel response output from the time axis interpolation section and outputting the waveform distortion-compensated signal;
   an error correction section for performing error correction for the waveform distortion-compensated signal from the distortion compensation section; and
   a source decoding section for decoding the error-corrected signal from the error correction section for each information source and outputting the decoded signal.

23. A channel response measurement apparatus for receiving an orthogonal frequency division multiplexing (OFDM) signal having a plurality of pilot carriers, the pilot carriers being carriers transmitting predetermined pilot signals at predetermined symbols, and measuring a channel response, the apparatus comprising:
   a Fourier transform section for transforming the received OFDM signal to a frequency-domain OFDM signal and outputting the frequency-domain OFDM signal;
   a pilot signal generation section for generating and outputting the predetermined pilot signals as frequency-domain signals;
   a channel response calculation section for determining channel responses corresponding to the transmitted pilot signals based on the frequency-domain OFDM signal and the output of the pilot signal generation section for each of the pilot carriers among a plurality of carriers constituting the frequency-domain OFDM signal; and a time axis interpolation section for determining and outputting, based on channel responses corresponding to first, second and third pilot signals transmitted sequentially in a same carrier, a channel response at a symbol between the second pilot signal and the third pilot signal.

24. A reception apparatus for receiving an orthogonal frequency division multiplexing (OFDM) signal having a plurality of pilot carriers, the pilot carriers being carriers transmitting predetermined pilot signals at predetermined symbols, the reception apparatus comprising:
- a Fourier transform section for transforming the received OFDM signal to a frequency-domain OFDM signal and outputting the frequency-domain OFDM signal;
- a pilot signal extraction section for extracting and outputting the transmitted pilot signals for each of the pilot carriers among a plurality of carriers constituting the frequency-domain OFDM signal;
- a time axis interpolation section for determining and outputting, based on first, second and third pilot signals transmitted sequentially in a same carrier, an interpolated signal at a symbol between the second pilot signal and the third pilot signal;
- a pilot signal generation section for generating and outputting the predetermined pilot signals as frequency-domain signals;
- a channel response calculation section for determining a channel response based on the interpolated signal and the output of the pilot signal generation section; and
- a distortion compensation section for compensating a waveform distortion in the frequency-domain OFDM signal according to the channel response.

25. The reception apparatus of claim 24, wherein, assuming that the OFDM signal has K (K is an integer equal to or more than 2) carriers, and that the first, second and third pilot signals of a carrier of a carrier index $k_p$ ($k_p$ is an integer indicating a carrier transmitting the pilot signals, satisfying $0 \leq k_p \leq K-1$) are transmitted at symbols of symbol indexes $l_p-N$, $l_p$ and $l_p+N$ ($l_p$ is an integer, and N is an integer equal to or more than 2), respectively, the time axis interpolation section executes linear operation for the first pilot signal $P(l_p-N, k_p)$, the second pilot signal $P(l_p, k_p)$ and the third pilot signal $P(l_p+N, k_p)$, $$-(u_m \cdot m/N) \cdot P(l_p - N, k_p) +$$
$$\{(2 \cdot u_m \cdot m + N - m)/N\} \cdot P(l_p, k_p) + \{(1 - u_m) \cdot m/N\} \cdot P(l_p + N, k_p)$$

($u_m$ is a real number satisfying $u_1 \neq 0$ and $u_1 \geq u_2 \geq \ldots \geq u_m \geq \ldots \geq u_{N-1}$, and m is an integer satisfying $1 \leq m \leq N-1$), and outputs an interpolated signal at a symbol of a symbol index $l_p+m$ for the carrier of the carrier index $k_p$.

26. A channel response measurement apparatus for receiving an orthogonal frequency division multiplexing (OFDM) signal having a plurality of pilot carriers, the pilot carriers being carriers transmitting predetermined pilot signals at predetermined symbols, and measuring a channel response, the apparatus comprising:
- a Fourier transform section for transforming the received OFDM signal to a frequency-domain OFDM signal and outputting the frequency-domain OFDM signal;
- a pilot signal extraction section for extracting and outputting the transmitted pilot signals for each of the pilot carriers among a plurality of carriers constituting the frequency-domain OFDM signal;
- a time axis interpolation section for determining and outputting, based on first, second and third pilot signals transmitted sequentially in a same carrier, an interpolated signal at a symbol between the second pilot signal and the third pilot signal;
- a pilot signal generation section for generating and outputting the predetermined pilot signals as frequency-domain signals; and
- a channel response calculation section for determining a channel response based on the interpolated signal and the output of the pilot signal generation section.

27. A reception method for receiving an orthogonal frequency division multiplexing (OFDM) signal having a plurality of pilot carriers, the pilot carriers being carriers transmitting predetermined pilot signals at predetermined symbols, the method comprising:
- a Fourier transform step of transforming the received OFDM signal to a frequency-domain OFDM signal;
- a pilot signal generation step of generating the predetermined pilot signals as frequency-domain signals;
- a channel response calculation step of determining channel responses corresponding to the transmitted pilot signals based on the frequency-domain OFDM signal and the pilot signals generated in the pilot signal generation step for each of the pilot carriers among a plurality of carriers constituting the frequency-domain OFDM signal;
- a time axis interpolation step of determining, based on channel responses corresponding to first, second and third pilot signals transmitted sequentially in a same carrier, a channel response at a symbol between the second pilot signal and the third pilot signal; and
- a distortion compensation step of compensating a waveform distortion in the frequency-domain OFDM signal according to the channel response determined in the time axis interpolation step.

28. The reception method of claim 27, wherein, assuming that the OFDM signal has K (K is an integer equal to or more than 2) carriers, and that the first, second and third pilot signals of a carrier of a carrier index $k_p$ ($k_p$ is an integer indicating a carrier transmitting the pilot signals, satisfying $0 \leq k_p \leq K-1$) are transmitted at symbols of symbol indexes $l_p-N$, $l_p$ and $l_p+N$ ($l_p$ is an integer, and N is an integer equal to or more than 2), respectively, the time axis interpolation step includes executing linear operation for the channel response $H(l_p-N, k_p)$ corresponding to the first pilot signal, the channel response $H(l_p, k_p)$ corresponding to the second pilot signal and the channel response $H(l_p+N, k_p)$ corresponding to the third pilot signal, $$-(u_m \cdot m/N) \cdot H(l_p - N, k_p) +$$
$$\{(2 \cdot u_m \cdot m + N - m)/N\} \cdot H(l_p, k_p) + \{(1 - u_m) \cdot m/N\} \cdot H(l_p + N, k_p)$$

($u_m$ is a real number satisfying $u_1 \neq 0$ and $u_1 \geq u_2 \geq \ldots \geq u_m \geq \ldots \geq u_{N-1}$, and m is an integer satisfying $1 \leq m \leq N-1$), and determining a channel response at a symbol of a symbol index $l_p+m$ for the carrier of the carrier index $k_p$.

29. A reception method for receiving an orthogonal frequency division multiplexing (OFDM) signal having a plurality of pilot carriers, the pilot carriers being carriers transmitting predetermined pilot signals at predetermined symbols, the reception method comprising:

a Fourier transform step of transforming the received OFDM signal to a frequency-domain OFDM signal;

a pilot signal extraction step of extracting the transmitted pilot signals for each of the pilot carriers among a plurality of carriers constituting the frequency-domain OFDM signal;

a time axis interpolation step of determining, based on first, second and third pilot signals transmitted sequentially in a same carrier, an interpolated signal at a symbol between the second pilot signal and the third pilot signal;

a pilot signal generation step of generating the predetermined pilot signals as frequency-domain signals;

a channel response calculation step of determining a channel response based on the interpolated signal and the pilot signals; and a distortion compensation step of compensating a waveform distortion in the frequency-domain OFDM signal according to the channel response.

30. The reception method of claim 29, wherein, assuming that the OFDM signal has K (K is an integer equal to or more than 2) carriers, and that the first, second and third pilot signals of a carrier of a carrier index $k_p$ ($k_p$ is an integer indicating a carrier transmitting the pilot signals, satisfying $0 \leq k_p \leq K-1$) are transmitted at symbols of symbol indexes $l_p-N$, $l_p$ and $l_p+N$ ($l_p$ is an integer, and N is an integer equal to or more than 2), respectively, the time axis interpolation step includes executing linear operation for the first pilot signal $P(l_p-N, k_p)$, the second pilot signal $P(l_p, k_p)$ and the third pilot signal $P(l_p+N, k_p)$, $$-(u_m \cdot m/N) \cdot P(l_p - N, k_p) +$$
$$\{(2 \cdot u_m \cdot m + N - m)/N\} \cdot P(l_p, k_p) + \{(1 - u_m) \cdot m/N\} \cdot P(l_p + N, k_p)$$

($u_m$ is a real number satisfying $u_1 \neq 0$ and $u_1 \geq u_2 \geq \ldots \geq u_m \geq \ldots \geq u_{N-1}$, and m is an integer satisfying $1 \leq m \leq N-1$), and outputting the results as an interpolated signal at a symbol of a symbol index $l_p+m$ for the carrier of the carrier index $k_p$.

31. The reception apparatus of claim 1, further comprising a frequency axis interpolation section for determining a channel response for a carrier having no insertion of pilot signals by interpolating the channel responses output from the time axis interpolation section determined for the respective pilot carriers, wherein the distortion compensation section compensates a waveform distortion in the frequency-domain OFDM signal according to the channel response output from the frequency axis interpolation section.

* * * * *